(12) United States Patent
Chunduru et al.

(10) Patent No.: US 12,322,104 B2
(45) Date of Patent: *Jun. 3, 2025

(54) APPARATUS AND METHODS FOR GENERATING A THREE-DIMENSIONAL (3D) MODEL OF CARDIAC ANATOMY VIA MACHINE-LEARNING

(71) Applicant: Anumana, Inc., Cambridge, MA (US)

(72) Inventors: Abhijith Chunduru, Bengaluru (IN); Uddeshya Upadhyay, Bengaluru (IN); Suthirth Vaidya, Bengaluru (IN); Sai Saketh Chennamsetty, Bengaluru (IN); Arjun Puranik, San Jose, CA (US)

(73) Assignee: Anumana, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,411

(22) Filed: Jun. 21, 2024

(65) Prior Publication Data

US 2025/0117928 A1 Apr. 10, 2025

Related U.S. Application Data

(63) Continuation of application No. 18/376,688, filed on Oct. 4, 2023, now Pat. No. 12,154,273.

(51) Int. Cl.
*G06T 7/00* (2017.01)

(52) U.S. Cl.
CPC .. *G06T 7/0012* (2013.01); *G06T 2207/10081* (2013.01); *G06T 2207/20081* (2013.01); *G06T 2207/30048* (2013.01)

(58) Field of Classification Search
CPC ......... G06T 7/0012; G06T 2207/10081; G06T 2207/20081; G06T 2207/30048
See application file for complete search history.

(56) References Cited

U.S. PATENT DOCUMENTS

| | | | |
|---|---|---|---|
| 10,475,216 B2* | 11/2019 | Jackson | A61B 6/5264 |
| 11,534,136 B2 | 12/2022 | Funka-Lea | |
| 2011/0201915 A1* | 8/2011 | Gogin | A61B 6/5288 600/407 |
| 2012/0165664 A1* | 6/2012 | Hill | A61B 8/483 600/437 |
| 2014/0336995 A1* | 11/2014 | Singer | G09B 23/303 703/2 |
| 2017/0329930 A1* | 11/2017 | Fonte | A61B 5/0263 |
| 2019/0099159 A1* | 4/2019 | Voigt | G06T 7/60 |
| 2019/0125295 A1* | 5/2019 | Tek | G16H 40/63 |

(Continued)

*Primary Examiner* — Van D Huynh
(74) *Attorney, Agent, or Firm* — Caldwell Intellectual Property Law

(57) ABSTRACT

An apparatus for generating a three-dimensional (3D) model of cardiac anatomy via machine-learning, wherein the apparatus includes a process and a memory containing instructions configuring the processor to receive a set of images of a cardiac anatomy pertaining to a subject, generate an 3D data structure representing the cardiac anatomy as a function of the set of images using a cardiac anatomy modeling model, generate an initial 3D model of the cardiac anatomy, refine the generated initial 3D model of the cardiac anatomy as a function of the 3D data structure representing the cardiac anatomy, and generate a subsequent 3D model of the cardiac anatomy as a function of the refinement.

20 Claims, 9 Drawing Sheets

(56) References Cited

U.S. PATENT DOCUMENTS

| | | | |
|---|---|---|---|
| 2020/0202973 A1* | 6/2020 | Kim | G16H 50/50 |
| 2022/0180513 A1* | 6/2022 | Smith | G16H 30/40 |
| 2022/0328195 A1 | 10/2022 | Mihalef | |
| 2022/0370033 A1 | 11/2022 | Klingensmith | |
| 2024/0001147 A1* | 1/2024 | Passerini | A61B 5/367 |

* cited by examiner

APPARATUS AND METHODS FOR GENERATING A THREE-DIMENSIONAL (3D) MODEL OF CARDIAC ANATOMY VIA MACHINE-LEARNING

CROSS-REFERENCE TO RELATED APPLICATIONS

This application is a continuation of Non-provisional application Ser. No. 18/376,688 filed on Oct. 4, 2023, and entitled "APPARATUS AND METHODS FOR GENERATING A THREE-DIMENSIONAL (3D) MODEL OF CARDIAC ANATOMY VIA MACHINE-LEARNING," the entirety of which is incorporated herein by reference.

FIELD OF THE INVENTION

The present invention generally relates to the field of machine learning and medical imaging. In particular, the present invention is directed to apparatus and methods for generating a three-dimensional (3D) model of cardiac anatomy via machine-learning.

BACKGROUND

A precise reconstruction of heart anatomy is of critical importance in order to achieve efficient and safe results in procedures such as atrial fibrillation (AF) ablation. Current LA reconstruction methods include Fast Anatomical Mapping (FAM), cardiac CT merging, and Ultrasound assisted anatomy reconstruction; however, existing processes are prone to overly long procedural times and excessive radiation exposure.

SUMMARY OF THE DISCLOSURE

In an aspect, an apparatus for generating a three-dimensional (3D) model of cardiac anatomy via machine-learning is described. The apparatus includes at least a process and a memory communicatively connected to the at least a processor, wherein the memory contains instructions configuring the at least a processor to receive a set of images of a cardiac anatomy pertaining to a subject, generate cardiac anatomy training data using a 3D heart model, where the cardiac anatomy training data comprises a plurality of synthetic images, and train a cardiac anatomy modeling model using the generated cardiac anatomy training data. Further, the processor may be configured to generate a three-dimensional (3D) data structure representing the cardiac anatomy using the trained cardiac anatomy modeling model and refine an initial 3D model as a function of the 3D data structure representing the cardiac anatomy.

In another aspect, a method for generating a three-dimensional (3D) model of cardiac anatomy via machine-learning is described. The method includes receiving, by at least a processor, a set of images of a cardiac anatomy pertaining to a subject, generating, by the at least a processor, cardiac anatomy training data using a 3D heart model, where the cardiac anatomy training data comprises a plurality of synthetic images, and training, by the at least a processor, a cardiac anatomy modeling model using the generated cardiac anatomy training data. Further, the method may include generating, by the at least a processor, a three-dimensional (3D) data structure representing the cardiac anatomy using the trained cardiac anatomy modeling model and refining, by the at least a processor, an initial 3D model as a function of the 3D data structure representing the cardiac anatomy.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for generating a 3D model of cardiac anatomy via machine-learning.

Aspects of the present disclosure can be used to simplify the ultrasound assisted anatomy reconstruction system by using an AI based algorithm to learn the positioning and 3D reconstruction directly from the ultrasound images. This is so, at least in part, because apparatus is configured to implement AI-based learning from CT datasets. In an embodiment, neural networks based estimation removes the need for complicated systems, such as manual segmentation and reconstruction methods, specialized hardware, FAM, among others.

Aspects of the present disclosure can be used to avoid a LA-RA trans-septal puncture for the same of anatomical visualization. Exemplary embodiments illustrating aspects of the present disclosure are described below in the context of several specific examples.

In one or more embodiments, apparatus and methods described herein may involve one or more aspects of precise reconstructing of the left atrium (LA), pulmonary veins (PV), and left atrial appendage (LAA) in atrial fibrillation (AF) ablation. "Atrial fibrillation (AF)," as described herein, is a cardiac arrhythmia characterized by irregular and often rapid heart rate. In some cases, AF may lead to various complications, including, without limitation, stroke, heart failure, and/or the like. "AF ablation," as described herein, is a procedure that aims to isolate and eliminate the abnormal electrical pathways causing the cardiac arrhythmia. LA, PV, and LAA are key structures involved in AF. In an embodiment, precise 3D reconstruction of LA, PV, and LAA may help in understanding their geometry and relationships which are essential for planning and/or executing AF ablation. In some cases, LA, PV, and LAA may be mapped in order to enable clinicians to identify one or more specific sites responsible for AF, allowing targeted ablation that minimizes damages to surrounding tissues. Additionally, or alternatively, apparatus and methods described herein may reduce the risk of complications such as, without limitation, perforation, stenosis, collateral damage, among others to adjacent structures. Apparatus and methods described herein may ensure ablation energy is delivered to the intended locations.

Figure 1:
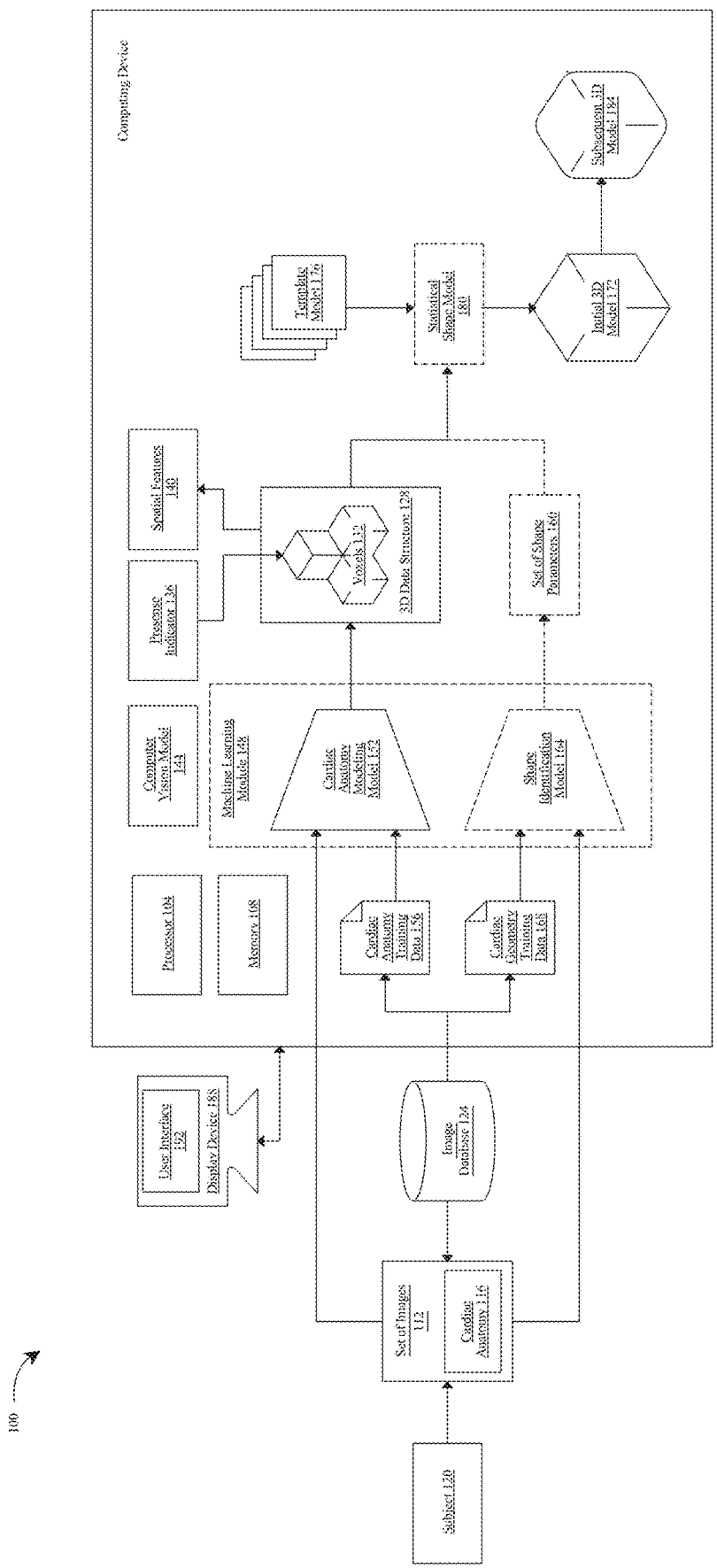
FIG. 1 is a block diagram of an exemplary embodiment of an apparatus for generating a three-dimensional (3D) model of cardiac anatomy via machine-learning.

Referring now to FIG. 1, an exemplary embodiment of an apparatus 100 for generating 3D model of a cardiac anatomy via machine-learning is illustrated. System includes at least a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus includes a memory 108 communicatively connected to at least a processor 104, wherein the memory 108 contains instructions configuring at least a processor 104 to perform any processing steps described herein. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a processor 104/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, processor is configured to receive a set of images 112 of a cardiac anatomy 116 pertaining to a subject 120. As used in this disclosure, a "set of images" refers to a collection or group of visual representations captured using any imaging modality or technique described herein. Set of images 112 may include, without limitation, two-dimensional images. In an embodiment, set of images 112 may include a set of intracardiac echocardiography (ICE) images, wherein the "set of ICE images" is a collection of ultrasound images obtained from within the heart's chambers or blood vessels. In some cases, ICE images may be captured using a specialized catheter equipped with an ultrasound transducer that is inserted into the body and guided to the heart of subject 120. In an embodiment, set of images 112 may provide a detailed and real-time visualizations of "cardiac anatomy," which refers to the structural composition of the heart and its associated blood vessels. Set of images 112 may also include internal structures, functions, and bold flow patterns of the heart of subject 120. Other exemplary embodiments of set of images 112 may include, without limitation, X-ray images, magnetic resonance imaging (MRI) scans, computed tomography (CT) scans, ultrasound images, optical images, digital photographs, or any other form of visual data. Additionally, images within set of images 112 may be related in terms of content, time of capture, sequence, or any other relevant parameters described herein. In a non-limiting example, each image of set of images 112 may represent a particular view, angle, or perspective of an object, subject, or scene, and may be in two-dimensional (2D) or 3D format. Images of set of images 112 may include, without limitation, any two-dimensional or three-dimensional images of any anatomy or anatomical structure, including without limitation images of any internal organ, tissue including without limitation muscular, connective tissue, epithelial tissue, and/ or nervous tissue, bone, and/or any other element that may be imaged within a human and/or animal body.

Still referring to FIG. 1, in a non-limiting example, cardiac anatomy 116 may include chambers (e.g., four chambers including left and right atria and left and right ventricles), valves (i.e., the structures that regulate blood flow between chambers and vessels, including mitral, tricuspid, aortic, and pulmonary valves), vessels (e.g., aorta, pulmonary arteries and veins, and coronary arteries), conduction system (i.e., a network of specialized cells that control the heart's electrical activity and rhythm), muscular and connective tissues (e.g., heart's muscular walls, septa, any other connective tissues that provide structural integrity and enable contraction), LAA and other appendages, pathological features (e.g., any abnormalities, defects, and/or the like), among others.

Still referring to FIG. 1, as used in this disclosure, a "subject" refers to an individual organism. In an embodiment, subject 120 may include a human, on whom or on which the procedure, study, or otherwise experiment, such as without limitation, AF ablation described herein, is being conducted. In some cases, subject 120 may include a provider of set of images 112 described herein. In other cases, subject 120 may include a recipient or a participant in a clinical trial or research study. In a non-limiting example, subject 120 may include a human patient with AF who is undergoing a procedure, an individual undergoing cardiac screening, a participant in a clinical trial, patient with congenital heart disease, heart transplant candidate, patient receiving follow-up care after cardiac surgery, healthy volunteer, patient with heart failure, or the like. Additionally, or alternatively, subject 120 may include an animal models (i.e., animal used to model AF such as a laboratory rat).

Still referring to FIG. 1, in an embodiment, each ICE image of set of ICE images may include a particular view of subject's 120 heart's chambers, valves, vessel, and/or the like. In a non-limiting example, set of images 112 may include multiple views e.g., different angles and perspectives of subject's 120 heart. In another embodiment, set of images 112 may be arranged in a temporal sequence. In a non-limiting example, set of images 112 may include a series of images captured over time, allowing for an observation of dynamic cardiac functions such as beating, blood flow, and/or the like. In some cases, each ICE image of set of images 112 may include a corresponding timestamp, wherein the timestamp may include an indicator showing a date and time of when the corresponding ICE image was taken.

Additionally, or alternatively, and still referring to FIG. 1, various imaging techniques or settings may be applied to set of images 112 that provide specific insights into cardiac anatomy 116. In some cases, cardiac anatomy 116 may include a plurality of physical characteristics, spatial relationships, and function aspects of the heart's component; for instance, and without limitation, receiving set of images 112 may include applying a doppler imaging technique, wherein the "doppler imaging technique" is a specialized ultrasound technique used to assess the movement of blood within the body, particularly within the heart and blood vessels. Processor 104 may configure a transducer to send high-frequency sound waves into the subject's 120 body, wherein the sound waves may bounce off moving blood cells and other structures. Reflected waves may then be picked up by the transducer and frequency of the reflected waves changes (Doppler shift) depending on the speed and direction of blood flow may be analyzed to determine one or more blood flow characteristics. In some cases, one or more ICE images within set of images 112 may include visual representations translated based on one or more blood flow characteristics. Such visual representations may be further color-coded, showing the speed and direction of blood flow. As an ordinary person skilled in the art, upon reviewing the entirety of this disclosure, will aware other exemplary modalities of ICE imaging such as, without limitation, computed tomography (CT) scans, magnetic resonance imaging MRI, positron emission tomography (PET) scan, angiography, electrocardiogram (ECG or EKG), single-photon emission computed tomography (SPECT), optical coherence tomography (OCT), thermography, tactile imaging, and/or the like.

With continued reference to FIG. 1, in one or more embodiments, receiving set of images 112 of cardiac anatomy 116 may include receiving a patient profile pertaining to subject 120. As used in this disclosure, a "patient profile" is a comprehensive collection of information related to an individual patient. In some cases, patient profile may include a variety of different types of data that, when combined, provide a detailed picture of a patient's overall health. In an embodiment, patient profile may include demographic data of patient, for example, and without limitation, patient profile may include basic information about the patient such as name, age, gender, ethnicity, socioeconomic status, and/or the like. In another embodiment, each patient profile may also include a patient's medical history, for example, and without limitation, patient profile may include a detailed record of the patient's past health conditions, medical procedures, hospitalizations, and illnesses such as surgeries, treatments, medications, and/or the like. In another embodiment, each patient profile may include lifestyle Information of patient, for example, and without limitation, patient profile may include details about the patient's diet, exercise habits, smoking and alcohol consumption, and other behaviors that could impact health. In a further embodiment, patient profile may include patient's family history, for example, and without limitation, patient profile may include a record of hereditary diseases. As an ordinary person skilled in the art, upon reviewing the entirety of this disclosure, will be aware of various type of data within patient profiles apparatus 100 may receive and process in consistent with this disclosure.

In a non-limiting example, and still referring to FIG. 1, patient profile may include one or more ICE images or set of images 112. Receiving set of images 112 may include extracting set of images 112 from patient profile (subsequent to patient identity verification and obtaining consent from subject 120). In some cases, patient profile of subject 120 may be obtained through hospital information system (HIS) or any other data acquisition platform to securely access patient's electronic medical record (EMR) or other relevant databases. Set of images 112 may be directly or indirectly downloaded or exported. In some cases, each ICE image of set of images 112 may be in a usable and/or computer-readable format such as, without limitation, DICOM format, and necessary metadata (e.g., patient information described above) may be included. Further, receiving set of images 112 may include recording the access and extraction of set of images 112; for instance, and without limitation, this process may be documented, by processor 104, in the patient's/subject's 120 medical record, databases, or other appropriate logs.

Further, and still referring to FIG. 1, in other embodiments, patient profile may include electrocardiogram (ECG) data, wherein the "ECG data," for the purpose of this disclosure, refers to data related to an electrocardiogram of the patient that corresponds to the patient profile. A "electrocardiogram," as described herein, is a medical test that records the electrical activity of subject's heart over a period of time. In an embodiment, ECG data may include one or more recordings captured by a plurality of electrodes placed on patient's skin. In one or more embodiments, ECG data may include information regarding a P wave, T wave, QRS complex, PR interval, ST segment, and/or the like. Processor 104 may associate set of images 112 with ECG data, or in other cases, receiving set of images 112 may include receiving ECG data pertaining to subject 120 associated with set of images 112. Such ECG data may be collected simultaneously during ICE imaging. In some cases, set of images 112 may be linked with ECG data by one or more unique identifiers, such as without limitations, timestamps or other metadata described herein. In a non-limiting example, ECG data may be used to identify specific cardiac events or phases of the cardiac cycle, and the corresponding ICE images may be analyzed to see how heart's structure changes during those times. Patient profile and ECG data described herein may be consistent with any patient profile and ECG data disclosed in U.S. patent application Ser. No. 18/229,854, filed on Aug. 3, 2023, entitled "APPARATUS AND METHOD FOR DETERMINING A PATIENT SURVIVAL PROFILE USING ARTIFICIAL INTELLIGENCE-ENABLED ELECTROCARDIOGRAM (ECG)," the entirety of which is incorporated herein by reference.

With continued reference to FIG. 1, in other embodiments, receiving set of images 112 may include receiving set of ICE images from an Image database 124. In some cases, Image database 124 may be implemented, without limitation, as a relational database, a key-value retrieval database such as a NOSQL database, or any other format or structure for use as a database that a person skilled in the art would recognize as suitable upon review of the entirety of this disclosure. Image database 124 may alternatively or additionally be implemented using a distributed data storage protocol and/or data structure, such as a distributed hash table or the like. Image database 124 may include a plurality of data entries and/or records as described above. Data entries in Image database 124 database may be flagged with or linked to one or more additional elements of information, which may be reflected in data entry cells and/or in linked tables such as tables related by one or more indices in Image database 124 or another relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

In a further embodiment, and still referring to FIG. 1, receiving set of images 112 may involve one or more image preprocessing steps. In some cases, processor 104 may be configured to calibrate one or more ICE images of set of images 112 by correct for distortions and ensure accurate spatial representation of cardiac anatomy 116 pertaining to subject 120. In a non-limiting example, processor 104 may select one or more reference objects within ICE image that needs calibration to correct spatial distortions. In some cases, processor 104 may be configured to place a phantom with pre-determine dimensions in such ICE image and adjust ICE image until the phantom's dimensions are accurately represented. In another non-limiting example, one or more ICE images' brightness and contrast may be adjusted, by processor 104 to ensure that echogenicity (reflectivity) of the tissues is accurately represented. One or more tissues with known echogenicity may be selected by processor 104 as reference tissues to adjust corresponding portions of the one or more ICE images. In other cases, standardized correction curves may be applied in or der to correct the echogenicity of ICE images. As an ordinary person skilled in the art, upon reviewing the entirety of this disclosure, may be aware of various calibration techniques, such as, without limitation, temporal calibration, geometric calibration, among others that can be used by processor 104 to preprocess set of images 112.

Additionally, or alternatively, and still referring to FIG. 1, receiving set of images 112 may include perform image segmentation on or more ICE images of set of images 112. In some cases, image segmentation may include separating specific structures or regions of interest (ROI) from the background or other structures in a given ICE image. In a non-limiting example, processor 104 may be configured to use edge detection algorithms to outline the heart chambers, separating them from surrounding tissues. One or more filters may be applied to highlight the boundaries between different types of tissues during the segmentation. In another non-limiting examples, valves and vessels may also be segmented by applying thresholding techniques. Processor 104 may be configured to set an intensity threshold based on the known echogenicity of blood and vessel walls and select pixels or regions having intensity below or above the intensity threshold from the given ICE image. In some cases, one or more machine learning models may be used to perform image segmentations, for example, and without limitation, a U-net (i.e., a convolution neural network containing a contracting path as an encoder and an expansive path as a decoder, wherein the encoder and the decoder forms a U-shaped structure).

With continued reference to FIG. 1, processor is configured to generate a 3D data structure 128 representing cardiac anatomy 116 as a function of set of images 112. In a non-limiting example, 3D data structure 128 may include a 3D voxel occupancy representation (VOR). As used in this disclosure, a "3D voxel occupancy representation (VOR)" of a cardiac anatomy is a 3D digital representation of a spatial structure of the cardiac anatomy, wherein the representation is composed of a plurality of discrete volumetric elements known as voxels 132. A "voxel," for the purpose of this disclosure, is a 3D equivalent of a pixel in 2D imaging. While a pixel represents a point in a 2D image and may include properties such as color and/or brightness, a voxel may represent a volume in a 3D space and may include additional properties such density/occupancy as described below. In an embodiment, each voxel of plurality of voxels 132 within 3D VOR may represent a specific portion of cardiac anatomy 116. In some cases, voxel may be a smallest distinguishable box-shaped part (i.e., 1 px·1 px·1 px) of a three-dimensional image. In some cases, each voxel of plurality of voxels 132 within VOR may be represented as a cube or rectangular prism (although other shapes may be used in specialized applications). Each voxel may include a size that determines a resolution of the 3D image or model. In an embodiment, smaller voxels may provide higher resolution; however, it may require more computational resources (e.g., RAM) for processor 104 to process.

In an embodiment, and still referring to FIG. 1, each voxel of plurality of voxels 132 within VOR may include one or more embedded values. As used herein, "embedded values" refers to specific numerical or categorical data associated with each voxel. In some cases, embedded values may represent various attributes or characteristics of the corresponding portion of cardiac anatomy 116 that voxel represents. In a non-limiting example, embedded values may include density values, intensity values, texture information, or any other quantitative measures that provide insights into the underlying cardiac tissue. Such embedded values may be derived from set of ICE images or other imaging modalities used to generate data structure 128. In some cases, embedded values may be utilized, by processor 104, to differentiate between different types of cardiac tissues, such as myocardial tissue, blood vessels, or chambers. Embedded values may also facilitate the visualization of dynamic cardiac functions, for example, and without limitation, blood flow or heart beating by encoding temporal information such as timestamps within plurality of voxels 132.

Still referring to FIG. 1, in an embodiment, each voxel of plurality of voxels 132 may include a presence indicator 136. As used in this disclosure, a "presence indicator" refers to a data element that indicates a presence or absence (i.e., occupancy) of cardiac tissue within that portion. In some cases, and without limitation, presence indicator 136 may include an occupancy status as one of the embedded values described herein. Portion may include a specific location within 3D space where data structure 128 is generated; for instance, and without limitation, a coordinate in 3D space represented in a tuple such as (x, y, z). In an embodiment, 3D VOR may provide a spatial framework that allows for the modeling and visualization of cardiac anatomy 116 in 3D space. In some cases, 3D data structure 128 may include a plurality of layers or slices (either horizontal [e.g., xy plane] or vertical [e.g., xz or yz plane depends on the view direction]), wherein each layer or slices of the plurality of layers or slices is corresponding to a different cross-sectional view of subject's 120 heart, and collectively forming a comprehensive 3D depiction of the cardiac structure. In a non-limiting example, 3D VOR having plurality of voxels 132 with presence indicators 136 may indicate whether each voxel in 3D space may be occupied by a part of subject's 120 heart. A binary value such as 0 or 1 may be configured as presence indicator to show ether a pixel of 3D space is occupied (e.g., 1) or empty (e.g., 0). In should be noted that other values may be used as presence indicator 136 such as a Boolean value e.g., TRUE or FALSE.

In some cases, and still reference to FIG. 1, one or more embedded values, such as, without limitations, occupancy, or density, may be derived from set of images 112 described herein by processor 104. In a non-limiting example, determining occupancy status of each voxel of plurality of voxels 132 may include converting set of ICE images to a set of binary images and determining occupancy status of each voxel as a function of the structure of interest's binary value. In some cases, occupancy status may include a value representing the likelihood of occupancy of the corresponding heart tissue. In another non-limiting example, density may be calculated, by processor 104, for each voxel as a function of the echogenicity of one or more pixels on a given ICE image, wherein, the brightness of the given ICE image may be analyzed since different tissues reflect ultrasound waves differently.

With continued reference to FIG. 1, generating 3D data structure 128 of cardiac anatomy 116 may include generating a 3D array. In some cases, processor 104 may divide 3D space into a grid of plurality of voxels 132, each with specific x, y, and z coordinates as embedded values. Each element of 3D array may correspond to a voxel. In some cases, 3D array may allow for easy access and manipulation of plurality of voxels 132, enabling various analyses, visualizations, and transformations either described or not described herein. In a non-limiting example, embedded values may include a density of the tissue at a specific location of a patient's body derived from one or more ICE images of set of images 112.

Additionally, or alternatively, and still referring to FIG. 1, 3D data structure 128 of cardiac anatomy 116 may include a 3D grid configured to map presence indicators 136 and/or other embedded values described herein of plurality of voxels 132 (e.g., tissue density, blood flow velocity, echogenicity or acoustic properties, and any other biophysical properties). As used in this disclosure, a "3D grid" refers to a 3D data structure that divides a given volume (e.g., volume of a heart) into a plurality of discrete units called cells (i.e., volume elements). In an embodiment, each cell within 3D grid may be associated with a distinct voxel. Mapping presence indicators 136 or other embedded values may include assigning each presence indicator or embedded value to each points within 3D grid such as corners of each corresponding cell. Such values may be derived from set of images 112 as described above.

In yet another embodiment, and still referring to FIG. 1, cells may be continuous, meaning that one or more cells may represent one or more continuous regions of space rather than discrete, separate units. In a non-limiting example, instead of being uniform, mapped presence indicator and/or other embedded values may vary continuously across different cells or cell's volume. In such embodiment, processor 104 may use interpolation to estimate other (unknown) embedded values within a range based on existing values such as known embedded values at specific points, thereby allowing for smooth transitions between cells. Exemplary interpolation methods may include, without limitation, linear interpolation, cubic interpolation, and/or the like. For example, and without limitation, if the corners of a cell have known values interpolation can be used to estimate the values at any point within the cell based on those corner values.

In a non-limiting example, and still referring to FIG. 1, 3D data structure 128 of cardiac anatomy 116 may include a 3D grid having a plurality of cells e.g., voxels, wherein each cell may contain a continuous range of values representing tissue density, blood flow velocity, or other properties (i.e., embedded values). Processor 104 may be configured to apply trilinear or tricubic interpolation to estimate tissue density within each cell based on presence indicator or other known values at the cell's boundaries, since tissue densities change gradually; Such 3D grid may provide a smooth, continuous representation of heat's internal structures, allowing for more nuanced analysis and visualization as described below. In a further embodiment, 3D grid with continuous cells may be additionally used in fluid dynamics simulations.

With continued reference to FIG. 1, in some case, presence indicators 136 and/or other embedded values may be mapped to 3D grid as a function of array masking, wherein specific array or grid may be selected to modify based on one or more pre-defined criteria. In a non-limiting example, processor 104 may generate a mask e.g., a binary array that defines which voxels or cells are affected. Mask may be used to select or modify specific voxels or cells based on certain attributes; for instance, and without limitation, processor 104 may use mask to isolate the LA within the heart focusing the analysis on that specific region. Such mask may include a criteria defined by specific density thresholds that distinguish the LA's tissue (i.e., voxels representing LA in 3D grid) from surrounding structures (i.e., neighboring voxels). In some cases, such mask may further include a binary mask, wherein each voxel in the 3D gird may be assigned a first presence indicator such as 1 if the voxel meets the criteria for the LA and a second presence indicator such as 0 if it does not. In some embodiments, mask may be directly applied to 3D grid, selecting, or modifying voxels or cells, thereby enabling processor 104 to highlight, exclude, or otherwise manipulate specific parts of cardiac anatomy 115 within 3D grid. Processor 104 may then perform an element-wise multiplication between 3D grid and the mask. Continuing from the previous non-limiting example, voxels corresponding to the LA (wherein the mask value is 1) may retain their original values, while other voxels (where the mask value is 0) may be set to 0 or other specific value (i.e., excluded or masked out).

With continued reference to FIG. 1, in some embodiments, 3D grid may include one or more spatial features 140 extracted from set of images 112 of cardiac anatomy 116. As used in this disclosure, "spatial features" are specific characteristics or attributes related to the spatial arrangement, shape, size, texture, or orientation of structures within a 3D space. In some cases, spatial features may include one or more embedded values described herein and their combinations thereof. In a non-limiting example, spatial feature may be represented numerically as a vector, a metric or other mathematical constructs that capture specific spatial characteristics. In some cases, spatial features 140 may also be visualized as contours, surfaces, or other geometric representations. In an embodiment, spatial features 140 may be extracted using edge detection, texture analysis, or other image processing techniques (e.g., cleaning and enhancing images, image segmentation, and/or the like). In another embodiment, one or more machine learning models, such as convolutional neural networks (CNNs) as described in further detail below, may be used to extract complex spatial features 140.

Still referring to FIG. 1, as used in this disclosure, a "vector" is a data structure that represents one or more a quantitative values and/or measures of one or more spatial features 140. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Still referring to FIG. 1, in a non-limiting example, one or more spatial features 140 may include one or more shape features (i.e., characteristics related to the shape of specific cardiac structures), such as curvature, surface area, volume, and/or the like. In another non-limiting example, one or more spatial features 140 may include one or more texture features (i.e., characteristics related to the texture or pattern within cardiac tissues, as seen set of images 112), such as gray-level co-occurrence matrix (GLCM) features representing the texture of heart muscle tissue. In another non-limiting example, one or more spatial features 140 may include one or more orientation features (i.e., characteristics related to the orientation or alignment of cardiac structures), such as the angle or alignment of the septum within the heart. In a further non-limiting example, one or more spatial features 140 may include one or more edge and boundary features (i.e., Characteristics related to the edges or boundaries between different cardiac structures or tissues), such as edge detection features highlighting the boundary between the myocardium and the cardiac chambers. As an ordinary person skilled in the art, upon reviewing the entirety of this disclosure, will be aware of various spatial features extracted from set of images 112 in consistent with this disclosure.

With continued reference to FIG. 1, in some embodiments, apparatus 100 may include a computer vision model 144 configured to generate 3D data structure 128 of cardiac anatomy 116. A "computer vision model," for the purpose of this disclosure, is a computation model designed to interpret and make determinations based on visual data. In an embodiment, computer vision model 144 may process set of images 112, to make a determination about a scene, space, and/or object in cardiac anatomy 116. In a non-limiting example, computer vision model 144 may be used for registration of plurality of voxels 132 within a 3D space. In some cases, registration may include image processing described herein, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient an ICE image relative a 3D coordinate system; exemplary transformations include without limitation homography transforms and affine transforms. In an embodiment, registration of ICE image to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto the ICE image; however, a third dimension of registration, representing depth and/or a z axis, may be detected by utilizing depth-sensing techniques such as Doppler imaging. Alternatively, the third dimension may be inferred from the known geometry and orientation of the imaging device (e.g., ICE catheter), or through the application of one or more machine learning models trained to interpret depth from the two-dimensional projection.

With continued reference to FIG. 1, processor 104 may use a machine learning module 148 to implement one or more algorithms or generate one or more machine learning models, such as a cardiac anatomy modeling model 152 to generate data structure 128 of cardiac anatomy 116. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. In a further embodiment, training data may include previous outputs such that one or more machine learning models iteratively produces outputs.

Still referring to FIG. 1, machine learning module 148 may be used to generate cardiac anatomy modeling model and/or any other machine learning models, such as, shape identification model as described in further detail below, using training data. Cardiac anatomy modeling model 152 may be trained by correlated inputs and outputs of training data. Training data may be data sets that have already been converted from raw data whether manually, by machine, or any other method. In an embodiment, generating data structure 128 of cardiac anatomy 116 includes receiving cardiac anatomy training data 156, wherein the cardiac anatomy training data 156 may include a plurality of image sets as input and a plurality of computed tomography (CT) based cardiac anatomy models as output, and wherein each image set of plurality of image sets may include any images described in this disclosure. In some cases, cardiac anatomy training data 156 may be received from Image database 124 or other databases. In other cases, cardiac anatomy training data 156 may be collected by a data acquisition unit from external sources such as one or more medical equipment's e.g., imaging devices or diagnostic tools, wherein the data acquisition may be configured as an intermediary between the data source and machine learning module 148.

Still referring to FIG. 1, as used in this disclosure, a "computed tomography (CT) based cardiac anatomy model" refers to a 3D representation of the heart and surrounding structures that is created using data from CT scans. Computed Tomography is a medical imaging technique that uses X-rays to capture cross-sectional images (slices) of the body. By taking a plurality of slices, a CT scan creates a detailed 3D representation of the internal structure. In an embodiment, CT-based cardiac anatomy model may include 3D representations of the heart including chambers, valves, blood vessels, and surrounding tissues. In some cases, CT-based cardiac anatomy model may be interactive; for instance, medical professionals may rotate, zoom, and/or explore CT-based cardiac anatomy model from various angles. In some cases, plurality of CT-based cardiac anatomy models may be generated prior to the training of the cardiac anatomy modeling model 152. Plurality of CT-based cardiac anatomy models may be generated using existing techniques in the field as described above such as, without limitation, FAM, cardiac CT merging, among others. In a non-limiting example, plurality of CT-based cardiac anatomy models may provide ground through or references models against cardiac anatomy modeling model 152 that is being trained. In a non-limiting example, generating data structure 128 of cardiac anatomy 116 further includes training cardiac anatomy modeling model 152 using cardiac anatomy training data described herein. Cardiac anatomy modeling model 152 trained using cardiac anatomy training data 156 may be able to interpret ICE images by learning relationships between ICE images and corresponding CT-based cardiac anatomy models. Processor 104 is further configured to generate data structure 128 of cardiac anatomy 116 as a function of set of images 112 using trained cardiac anatomy modeling model 152. In some cases, data structure 128 e.g., 3D VOR may be interpreted, visualized, and analyzed by processor 104 in similar manner to CT-based cardiac anatomy models, wherein both are 3D structures that correspond to ICE images.

With continued reference to FIG. 1, in an embodiment, cardiac anatomy modeling model comprises a deep neural network (DNN). As used in this disclosure, a "deep neural network" is defined as a neural network with two or more hidden layers. Neural network is described in further detail below with reference to FIGS. 4-5. In a non-limiting example, cardiac anatomy modeling model may include a convolutional neural network (CNN). Generating 3D data structure 128 of cardiac anatomy 116 may include training CNN using cardiac anatomy training data and generating 3D data structure 128 as a function of set of images 112 using trained CNN. A "convolutional neural network," for the purpose of this disclosure, is a neural network in which at least one hidden layer is a convolutional layer that convolves inputs to that layer with a subset of inputs known as a "kernel," along with one or more additional layers such as pooling layers, fully connected layers, and the like. In some cases, CNN may include, without limitation, a deep neural network (DNN) extension. Mathematical (or convolution) operations performed in the convolutional layer may include convolution of two or more functions, where the kernel may be applied to input data e.g., set of images 112 through a sliding window approach. In some cases, convolution operations may enable processor 104 to detect local/global patterns, edges, textures, and any other spatial features 140 described herein within each ICE image of set of images 112. Spatial features 140 may be passed through one or more activation functions, such as without limitation, Rectified Linear Unit (ReLU), to introduce non-linearities into the processing step of generating 3D data structure 128 of cardiac anatomy 116. Additionally, or alternatively, CNN may also include one or more pooling layers, wherein each pooling layer is configured to reduce the dimensionality of input data while preserving essential features within the input data. In a non-limiting example, CNN may include one or more pooling layer configured to reduce the spatial dimensions of spatial feature maps by applying downsampling, such as max-pooling or average pooling, to small, non-overlapping regions of one or more spatial features 140.

Still referring to FIG. 1, CNN may further include one or more fully connected layers configured to combine spatial features 140 extracted by the convolutional and pooling layers as described above. In some cases, one or more fully connected layers may allow for higher-level pattern recognition. In a non-limiting example, one or more fully connected layers may connect every neuron (i.e., node) in its input to every neuron in its output, functioning as a traditional feedforward neural network layer. In some cases, one or more fully connected layers may be used at the end of CNN to perform high-level reasoning and produce the final output such as, without limitation, a 3D data structure 128 of cardiac anatomy 116. Further, each fully connected layer may be followed by one or more dropout layers configured to prevent overfitting, and one or more normalization layers to stabilize the learning process described herein.

With continued reference to FIG. 1, CNN may further include a 3D CNN, wherein the 3D CNN, unlike standard 2D CNN, may include utilization of one or more 3D convolutions which allow them to directly process 3D data, thereby enabling processor 104 to generate 3D structures such as 3D data structure 128 of cardiac anatomy 116 using the 3D CNN. In a non-limiting example, 3D CNN may include one or more 3D filters (i.e., kernels) that move through the set of images 112 in three dimensions and capturing spatial relationships in x, y, and z axis. Similar to 3D convolutions, 3D CNN may further include one or more 3D pooling layers that may be used to reduce the dimensionality of ICE images while preserving spatial features 140 as described above. Additionally, or alternatively, an encoder-decoder structure may be implemented (extended to 3D), by processor 104, in 3D CNN, wherein the encoder-decoder structure includes an encoding path that captures the context and a decoding path that enables precise localization in a same manner as U-net as described above. Such encoder-decoder structures may also include a plurality of skip connections, allowing 3D CNN to use information from multiple resolutions to improve the process of generating 3D data structure 128 of cardiac anatomy 116.

With continued reference to FIG. 1, in an embodiment, training the cardiac anatomy modeling model 152 (i.e., CNN) may include selecting a suitable loss function to guide the training process. In a non-limiting example, a loss function that measures the difference between the predicted 3D VORs and the ground truth 3D structure e.g., CT-based cardiac anatomy models may be used, such as, without limitation, mean squared error (MSE) or a custom loss function may be designed for one or more embodiments described herein. Additionally, or alternatively, optimization algorithms, such as stochastic gradient descent (SGD), may then be used to adjust the cardiac anatomy modeling model's parameters to minimize such loss. In a further non-limiting embodiment, instead of directly predicting 3D data structure 128, cardiac anatomy modeling model 152 may be trained as a regression model to predict presence indicators 136 and/or other embedded values described herein for each voxel of plurality of voxels 132 within a 3D grid. Additionally, CNN may be extended with additional deep learning techniques, such as recurrent neural networks (RNNs) or attention mechanism, to capture additional features and/or data relationships within input data. These extensions may further enhance the accuracy and robustness of the cardiac anatomy modeling.

With continued reference to FIG. 1, alternatively, processor 104 may generate a set of shape parameters 160 based on set of images 112. As used in this disclosure, a "set of shape parameters" refers to a collection of numerical values or descriptors that quantitatively represent the geometric or morphological characteristics of a structure e.g., a heart. In a non-limiting example, set of shape parameters 160 may include information and/or metadata calculated, determined, and/or extracted from set of ICE images, such as, dimensions, angles, curvatures, surface areas, texture, symmetry, and/or the like. In other embodiments, processor 104 may be configured to parameterize features (e.g., edges, textures, contours, and any other characteristics that describe the shape cardiac anatomy 116) extracted from set of images 112 using CNN described herein. Such parameterization may involve processor 104 to derive one or more shape parameters including one or more morphological descriptors that quantitatively describe cardiac anatomy 116 based on extracted features. In some cases, processor 104 may be configured to use principal component analysis (PCA) to reduce the dimensionality of set of shape parameters 160, allowing processor 104 to focusing on the most informative shape parameters of set of shape parameters 160 in further processing steps described below.

With continued reference to FIG. 1, in a non-limiting example, set of shape parameters 160 may be generated based on set of images 112 using machine learning model such as, without limitation, a shape identification model 164. Generating set of shape parameters 160 may include receiving cardiac geometry training data 168, wherein the cardiac geometry training data 168 may include a plurality of image sets as input correlated to a plurality of shape parameter sets as output. In some cases, cardiac geometry training data may be received from Image database 124 described herein. For example, and without limitation, cardiac geometry training data 168 may be used to show each ICE image may indicate a particular set of shape parameters. Shape identification model 164 may be trained, by processor 104, using cardiac geometry training data 168. Additionally, cardiac geometry training data 168 may include previously input image sets and their corresponding shape parameters output. Shape identification model 164 may be iterative such that outputs may be used as future inputs of shape identification model 164. This may allow the shape identification model 164 to evolve. Processor 104 may be further configured to generate set of shape parameters 160 as a function of set of images 112 using the trained shape identification model 164.

With continued reference to FIG. 1, processor 104 is configured to generate an initial 3D model 172 of cardiac anatomy 116. As used in this disclosure, an "initial 3D model" is a foundational representation, capturing the basic geometric and spatial characteristics of the heart in 3D space. In an embodiment, initial 3D model 172 may provide a "starting point" for further refinement and customization as described in further detail below, allowing for the incorporation of more detailed and patient-specific information. In some cases, initial 3D model 172 may be generated through a direct 3D reconstruction from a series of (2D) ICE images. In a non-limiting example, set of images 112 may include a plurality of ICE images captured from different angles and positions within the heart. Processor 104 may be configured to apply one or more 3D reconstruction algorithms, such as without limitation, marching cubes, contour detection and segmentation, active contour models, and/or the like to create a coherent 3D representation e.g., initial model 172 of cardiac anatomy 116. In some cases, such direct 3D reconstruction may leverage the inherent spatial information within set of images 112, providing a direct and intuitive way to model the initial model 172 of the heart's structure. In a further embodiment, generic 3D modeling techniques may be applied to create the initial 3D model. In some cases, generic 3D modeling techniques may include surface modeling, solid modeling, or parametric modeling, among others. As an ordinary person skilled in the art, upon reviewing the entirety of this disclosure, will be aware of various 3D reconstruction algorithms may be used by processor 104 to generate initial 3D model 172 of cardiac anatomy 116.

Additionally, or alternatively, and still referring to FIG. 1, initial 3D model 172 may be generated based on a plurality of standard anatomical templates, wherein the "plurality of standard anatomical templates," for the purpose of this disclosure, refers to predefined and commonly accepted representations of the human body's anatomical structures. In some cases, plurality of standard anatomical templates may be selected from Image database 124 as described herein based on statistical averages or shared characteristics. In a non-limiting example, initial 3D model 172 may include a template model 176 selected from a plurality of pre-determined template models. Plurality of pre-determined template model may be generated by processor 104 based on plurality of standard anatomical templates prior to the generation of initial 3D model 172 using 3D reconstruction/modeling algorithms/techniques as listed above. In an embodiment, generating initial 3D model 172 may include selecting template model 176 from plurality of template models based on set of ICE images. In some cases, template model 176 may represent a typical or average cardiac anatomy that is most similar to cardiac anatomy 116 pertaining to subject 120. Such similarity may be determined based on one or more similarity metrics, such as without limitation, structural similarity index (SSI), MSE, peak signal-to-noise ratio (PSNR), normalized cross-correlation (NCC), Pearson correlation coefficient, and/or the like between set of images 112 and each image sets stored in Image database 124. Template model 176 may be adjusted and customized to fit the specific patient's ICE images as described below in further detail.

With continued reference to FIG. 1, processor 104 is configured to refine generated initial 3D model 172 of cardiac anatomy 116 as a function of 3D data structure 128 of cardiac anatomy 116. In a non-limiting embodiment, refining initial 3D model 172 of cardiac anatomy 116 may include utilizing a statistical shape model (SSM) 180. It should be noted that SSM May not be the only method for refining initial 3D model 172. A person of ordinary skill in the art, upon reviewing the entirety of this disclosure, will be aware of various methods, such as, without limitation, mesh smoothing techniques, level set method, physics-based simulation, among others may be implemented, by processor 104, to refine initial 3D model 172 described herein. As used in this disclosure, a "statistical shape model (SSM)" is a data structure representing, including, and/or utilizing a mathematical model that captures principal modes of variation in shape across a population of cardiac anatomies. In some cases, SSM may be constructed by analyzing one or more datasets of shapes and identifying, for example, mean shapes and main modes of variation within the one or more datasets. In a non-limiting example, SSM may start with calculation of at least one mean shape, which represents an average geometry of all the heart shapes in a given dataset, wherein the at least one mean shape may be served as a central reference point for processor 104 to understand different variations. In some cases, dataset may include, without limitation, cardiac anatomy training data 156, cardiac geometry training data 168, and/or any datasets within ICE image databases described herein. SSM may also identify one or more principal modes of variation within given datasets described herein, wherein the "principal modes of variations," for the purpose of this disclosure, refer to main patterns or directions along which data points vary within dataset. In a non-limiting example, identifying principal modes of variations may include applying principal component analysis (PCA) on given dataset. Additionally, or alternatively, shapes may be described directly using plurality of shape parameter sets (in cardiac geometry training data 168). In some cases, shape parameter sets may correspond to a plurality of modes of variations. Further, one or more statistical constraints (e.g., mean, variance, correlation, boundary, proportion constraint and/or the like) may be introduced into SSM 180 based on the distribution of shape parameters within plurality of shape parameter sets.

With continued reference to FIG. 1, refining initial 3D model 172 of cardiac anatomy 116 may include aligning initial 3D model 172 with 3D VOR of cardiac anatomy 116. In an embodiment, aligning initial 3D model 172 with 3D VOR may include matching template model 176 to 3D VOR; for instance, and without limitation, this may involve adjusting the position, orientation, and scale of template model 176 to match the spatial distribution captured in 3D VOR. In some cases, matching template model 176 to 3D VOR may include matching spatial features 140, wherein matching the spatial features 140 may further include aligning the surface, boundaries and internal structures of template model 176 with corresponding features in 3D VOR. In some embodiments, processor 104 may utilize one or more optimization techniques to achieve a desired alignment; for instance, and without limitation, processor may be configured to minimizing the difference between template model 176 and 3D VOR using iterative closest point (ICP) algorithms, gradient descent, or any other optimization strategies. Additionally, alignment of template model 176 with 3D VOR may also allow incorporation of patient-specific details (e.g., patient profile) into initial 3D model 172 to form a final model as described in further detail below.

In a non-limiting example, and still referring to FIG. 1, refining initial 3D model 172 of cardiac anatomy 116 may include deforming, using processor 104, template model 176 to match 3D data structure 128 of cardiac anatomy 116. As used in this disclosure, "deforming" means altering the geometric structure of a structure e.g., template model 176 in a systematic and controlled manner to align the structure with the spatial characteristics captured in another structure e.g., 3D VOR. In some cases, processor 104 may utilize one or more mathematical deformation models such as, without limitation, B-splines, radial basis functions, or other deformation functions to control and guide the deformation process of template model 176. In some cases, one or more constraints listed above may be applied, by processor 104, based on anatomical knowledge, biomechanical properties, or other relevant factors to ensure that the deformation of template model 176 is realistic and consistent with physiological principles as would be understood and/or expected by an ordinary person skilled in the art.

Still referring to FIG. 1, additionally, or alternatively, refining initial 3D model 172 of cardiac anatomy 116 may also include validating template model or deformed template model against 3D data structure 128 or additional data such as, without limitation, expert input, adjust parameters, and/or the like. Such validation process may ensure that the refined model accurately represents the underlaying cardiac anatomy 116. In some cases, expert input may include any user input entered via a user interface as described in further detail below. In a non-limiting example, expert input may include, without limitation, clinical assessment, anatomical knowledge, or other professional insights that guide and evaluate the refinement process inputted to apparatus 100 by one or more users including medical professionals, subjects, patients, and/or any other related individuals. In a further embodiment, validating template model or deformed template model against 3D data structure 128 may also include fine-tuning defamation controls, alignment settings, or other model characteristics or properties to achieve desired alignment with 3D VOR or additional data. In some cases, other information that is incorporated and codified within template model 176/deformed template model and/or 3D data structure 128 such as medical imaging, biomechanical simulations, patient-specific data/metadata may be validated and cross-verified. At least a machine-learning process, for example a machine-learning model described herein, may be used to validate by processor 104. Processor 104 may use any machine-learning process described in this disclosure for this or any other functions.

With continued reference to FIG. 1, in some embodiments, embedded values described herein may be employed in the refinement process of initial 3D model 172 of cardiac anatomy 116. In a non-limiting example, the embedded values may contribute to SSM 180 by providing additional parameters that guide the deformation and alignment of the template to match 3D VOR. Embedded values such as, without limitation, presence indicators 136 may be used by processor 104 to guide the deformation process by providing targets for alignment; for instance, and without limitation, SSM may be configured to identify specific target areas where initial 3D model e.g., a 3D LA model that needs to be deformed. Presence indicators 136, in this case, may reveal a bulge in LA wall that is not present in initial 3D model 172. In some cases, presence indicators 136 may define the exact shape of the bulge in LA wall. Processor 104 may then deform initial 3D model 172, particularly the wall to match the bulge defined by presence indicators 136 in 3D VOR.

With continued reference to FIG. 1, processor 104 is configured to generate a subsequent 3D model 184 of cardiac anatomy 116 as a function of the refinement. As used in this disclosure, a "subsequent 3D model" refers to a more detailed and accurate 3D representation of cardiac anatomy 116. In an embodiment, subsequent 3D model 184 may be derived from initial 3D model 172 and/or template model 176 and adjusted based on 3D data structure 128 and described above. In such embodiment, subsequent 3D model 184 may include a deformed initial 3D model 172 and/or template model 176. In a non-limiting example, 3D VOR may indicate a need of adjustment to initial 3D model 172 of left ventricle to match subject's 120 unique geometry. SSM 180 may then be configured to generate subsequent 3D model 184 that accurately captures such specific cardiac anatomy based on initial 3D model 172 and 3D VOR. In other cases, initial 3D model 172 may not need any refinement; for instance, and without limitation, if initial 3D model 172 already align perfectly with 3D data structure representing subject's 120 right atrium (RA), no deformation or adjustment would be necessary, thereby resulting in subsequent 3D model 184 that is identical to initial 3D model 172.

Still referring to FIG. 1, in some cases, the refinement process may also include the incorporation of more detailed features and textures based on 3D data structure 128 and embedded values thereof, enhancing the realism and specificity of initial 3D model 172. In an embodiment, SSM 180 may be integrated with one or more additional models such as, without limitation, texture models, appearance models, or functional models to generate subsequent 3D model 184. In some cases, such integration may result in subsequent 3D model 184 that reflects not just the geometry but also the biomechanical properties or blood flow dynamics within cardiac anatomy 116. In a non-limiting example, texture of the myocardium may be modeled, by integrating texture models with SSM 180, to represent the fibrous nature of the heart muscle. In another non-limiting example, appearance of blood vessels, including color variations and translucency, may be modeled, by integrating appearance models with SSM 180.

With continued reference to FIG. 1, alternatively, refining initial 3D model 172 of cardiac anatomy 116 may include adjusting template model 176 based on set of shape parameters 160. In an embodiment, processor 104 may be configured to map set of shape parameters 160 to SSM 180. The mapping process may define how template model 176 should be adjusted to represent specific subject's 120 cardiac anatomy. In a non-limiting example, shape parameters may include one or more numeric values indicating a particular thick ventricular wall, processor 104 may configure SSM 180 to adjust template model 176 to reflect such characteristic. In an embodiment, generating subsequent 3D model 184 may involve generating a 3D mesh or grid that accurately represents the shape defined by set of shape parameters; for instance, and without limitation, processor 104 may be configured to generate a 3D mesh for left ventricle with vertices and edges positioned according to specific curvature and thickness defined by set of shape parameters 160 using SSM 180.

With continued reference to FIG. 1, in some embodiments, processor 104 may be configured to input subsequent 3D model 184 back into cardiac anatomy modeling model 152 and/or shape identification model 164 for continuous learning. In some cases, training data for these models such as, without limitation, cardiac anatomy training data 156, cardiac geometry training data 168, and/or the like may be updated, by replacing, appending or otherwise inserting subsequent 3D model 184 (and corresponding set of ICE images) into the dataset. This iterative process may allow machine learning module 148 to evolve over time, adapting to new set of ICE images and improving the accuracy of machine learning models generated by machine learning module 148. Incorporation of subsequent 3D models as additional training data may enable apparatus 100 to capture more variations and nuances in cardiac anatomy modeling, enhancing its ability to generalize across different patients and conditions.

Still referring to FIG. 1, additionally, processor 104 may use user feedback to train the machine-learning models described above. For example, cardiac anatomy modeling model 152 and/or shape identification model 164 may be trained using past inputs and outputs of cardiac anatomy modeling model 152 and/or shape identification model 164. In some embodiments, if user feedback indicates that a subsequent 3D model outputted by SSM 180 was "bad," then that output and the corresponding input e.g., set of ICE images, corresponding CT-based cardiac anatomy model, and/or template model, may be removed from training data used to train cardiac anatomy modeling model 152 and/or shape identification model 164, and/or may be replaced with a value entered by, e.g., another user that represents an ideal 3D model of the heart given the input the machine learning models originally received, permitting use in retraining, and adding to training data as described above; in either case, machine learning models described herein may be retrained with modified training data. In some embodiments, training data such as cardiac anatomy training data 156 and/or cardiac geometry training data 168 may include user feedback. Further, apparatus 100 may be configured to validate one or more machine learning models described herein against real-world data, identifying areas where machine learning models may be underperforming or misaligned with clinical needs. Such feedback may also be used to guide model training, ensuring that machine learning models are not only accurate but also clinically meaningful and aligned with healthcare or medical professional's needs and priorities.

With continued reference to FIG. 1, apparatus 100 may further include a display device 188. As used int his disclosure, a "display device" is an electronic device that visually presents information to a user. In an embodiment, display device may include an output interface that translates data such as, without limitation, subsequent 3D model 184 from processor 104 or other computing devices into a visual form that can be easily understood by user. In some cases, subsequent 3D model 184 and/or other data described herein such as, without limitation, ICE images, 3D VOR, shape parameters initial model and/or template model may also be displayed through display device 188 using a user interface 192. User interface 192 may include a graphical user interface (GUI), wherein the GUI may include a window in which subsequent 3D model 184 and/or other data described herein may be displayed. In an embodiment, user interface 192 may include one or more graphical locator and/or cursor facilities allowing user to interact with subsequent 3D model 184 and/or any other data, or even process described herein; for instance, and without limitation, by using a touchscreen, touchpad, mouse, keyboard, and/or other manual data entry device, user may enter user input containing selecting specific regions, adding comments, adjusting parameter, and/or the like. In a non-limiting example, user interface 192 may include one or more menus and/or panels permitting selection of measurements, models, visualization of data/model to be displayed and/or used, elements of data, functions, or other aspects of data/model to be edited, added, and/or manipulated, options for importation of and/or linking to application programmer interfaces (APIs), exterior services, data source, machine-learning models, and/or algorithms, or the like. Persons skilled in the art, upon reviewing the entirety of this disclosure, will be aware of various ways in which a visual interface and/or elements thereof may be implemented and/or used as described in this disclosure.

Figure 2:
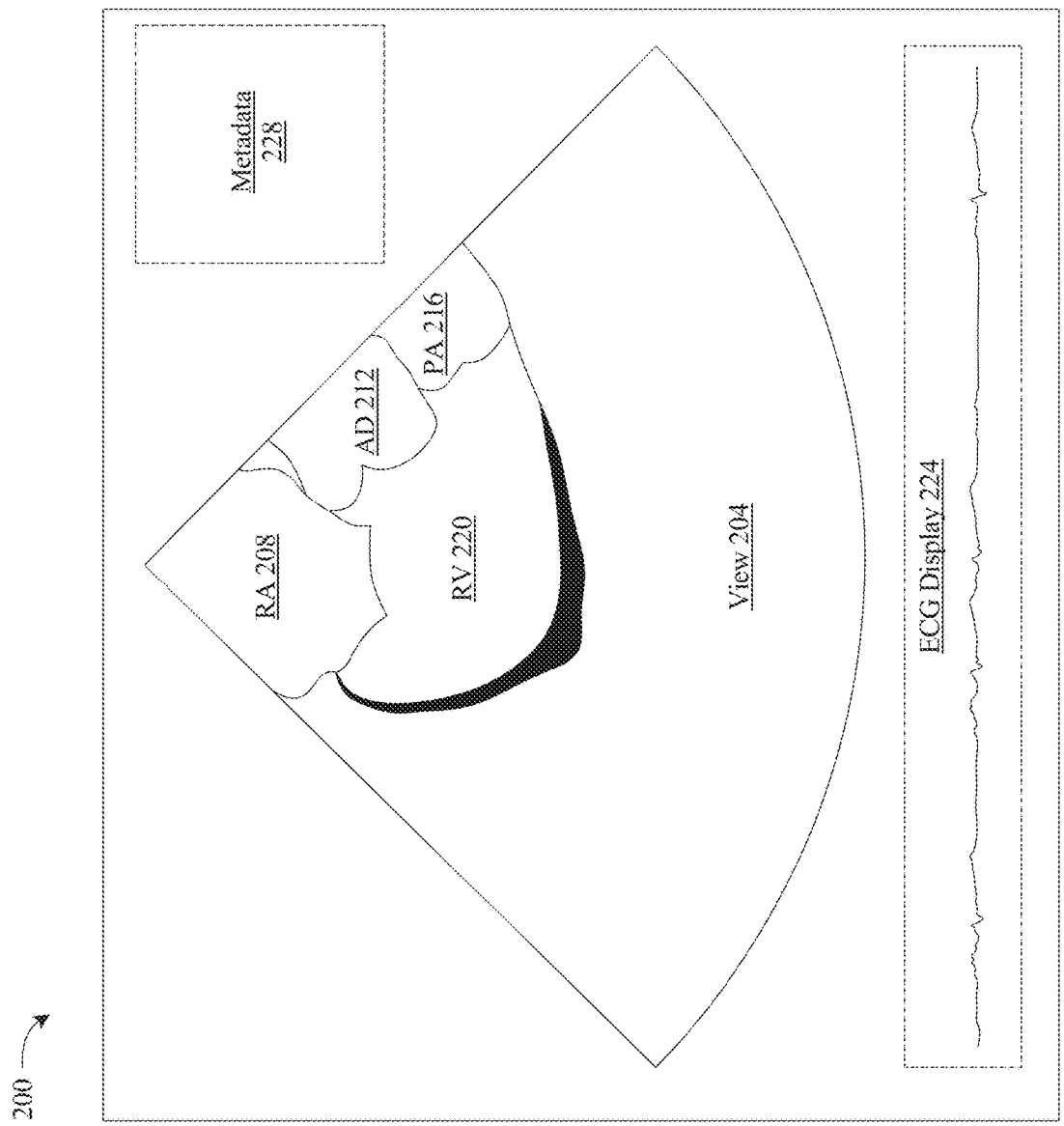
FIG. 2 shows an exemplary embodiment of an intracardiac echocardiography (ICE) image.

Now referring to FIG. 2, an exemplary embodiment of an ICE image 200 is illustrated. As described above with reference to FIG. 1, set of images 112 may include a plurality of ICE images, wherein each ICE image of the plurality of ICE images is a specialized form of echocardiography that may provides detailed image of heart's (i.e., cardiac anatomy 116) interior structures. In a non-limiting example, plurality of ICE images may include an ICE video (e.g., plurality of ICE images arranged in a corresponding time sequence). In an embodiment, ICE image 200 may be real-time, dynamic ultrasound image that provide a (detailed) view 204 of heart's interior structures, including, without limitation, right atrium (RA) 208, anterior descending (AD) 212, pulmonary atresia (PA) 216, and right ventricular (RV) 220.

With continued reference to FIG. 2, in some cases, ICE image 200 may include gray scaled image. It should be noted that, in some cases, ICE image 200 may be configured to visualize blood flow and/or blood flow patterns within the heart via color doppler as described above with FIG. 1. In some cases, resolution and/or clarity of ICE image 200 as described herein may be superior to transthoracic or transesophageal echocardiography due to the ICE catheter may be positioned inside the heart, closer to the structures being imaged.

Still referring to FIG. 2, in a non-limiting example, heart chambers 208 may appear as dark, anechoic (black) areas since they are filled with blood, which doesn't reflect ultrasound waves well. Heart walls, valves, and/or other structures may appear as varying shades of gray, depending on their density and composition, in some cases, Color Doppler overlays may show blood flow in different colors, indicating the direction and speed of blood flow. For instance, and without limitation, red may indicate flow towards the probe, while blue may indicate flow away from the probe.

With continued reference to FIG. 2, in a non-limiting embodiment, ICE image 200 may be synchronized with ECG data as described above with reference to FIG. 1, allowing for precise timing of cardiac events with anatomical visualization provided by ICE. In some cases, ICE image 200 may include a ECG display 224 configured to display ECG waveform as a continuous line graph at the top, bottom, or side of ICE image 200. In some cases, specific parts of the cardiac cycle e.g., systole or diastole, may be correlated with visual data from ICE image 200.

Additionally, or alternatively, and still referring to FIG. 2, ICE image 200 may come with accompanying metadata 228 displayed on the side or corners of ICE image 200 as described herein. In some cases, metadata 228 may provide essential contextual information about ICE image 200 and/or the corresponding patient. In a non-limiting example, metadata 228 may include patient information (e.g., patient ID, name, DOB, age, gender, and the like), image acquisition details (e.g., date and time, probe type, frequency, depth, gain, and the like), procedure-related information (e.g., procedure name, operator, location, and the like), ECG trace (e.g., ECG data as described above), measurement annotations (e.g., any measurements taken directly on the image e.g., diameter, a value of thickness of a heart wall and the like), image sequence information (e.g., image number, total number of frames, and the like), comments or notes, hospital or clinic information, and/or the like. As an ordinary person skilled in the art, upon reviewing the entirety of this disclosure, will be aware of ICE image 200 and various components thereof may be incorporated by apparatus 100 for generating 3D model of cardiac anatomy.

Now referring to I, a flow diagram of an exemplary embodiment of an ICE example generation process 300. In an embodiment, cardiac anatomy training data 156 may be generated, at least in part, via ICE example generation process 300. In some cases, processor 104 may be configured to receive a 3D model of the heart, such as, without limitation, template model 176, initial model 172, subsequent 3D model 184, and/or any 3D model of cardiac anatomy 116 as described herein and identify an ICE view 304 (i.e., visual representation of image obtained using intracardiac echocardiography as described above e.g., ICE image 200) based on the received 3D model. In some cases, 3D model received by processor 104 may be derived from CT scans as described above with reference to FIG. 1. In other cases, processor may receive CT scans directly instead of 3D models. A synthetic ICE frame 308 may then be generated, by processor 104, as a function of identified ICE view 304, wherein the synthetic ICE frame 208 may be used as one or the training examples in cardiac anatomy training data 156.

Figure 3:
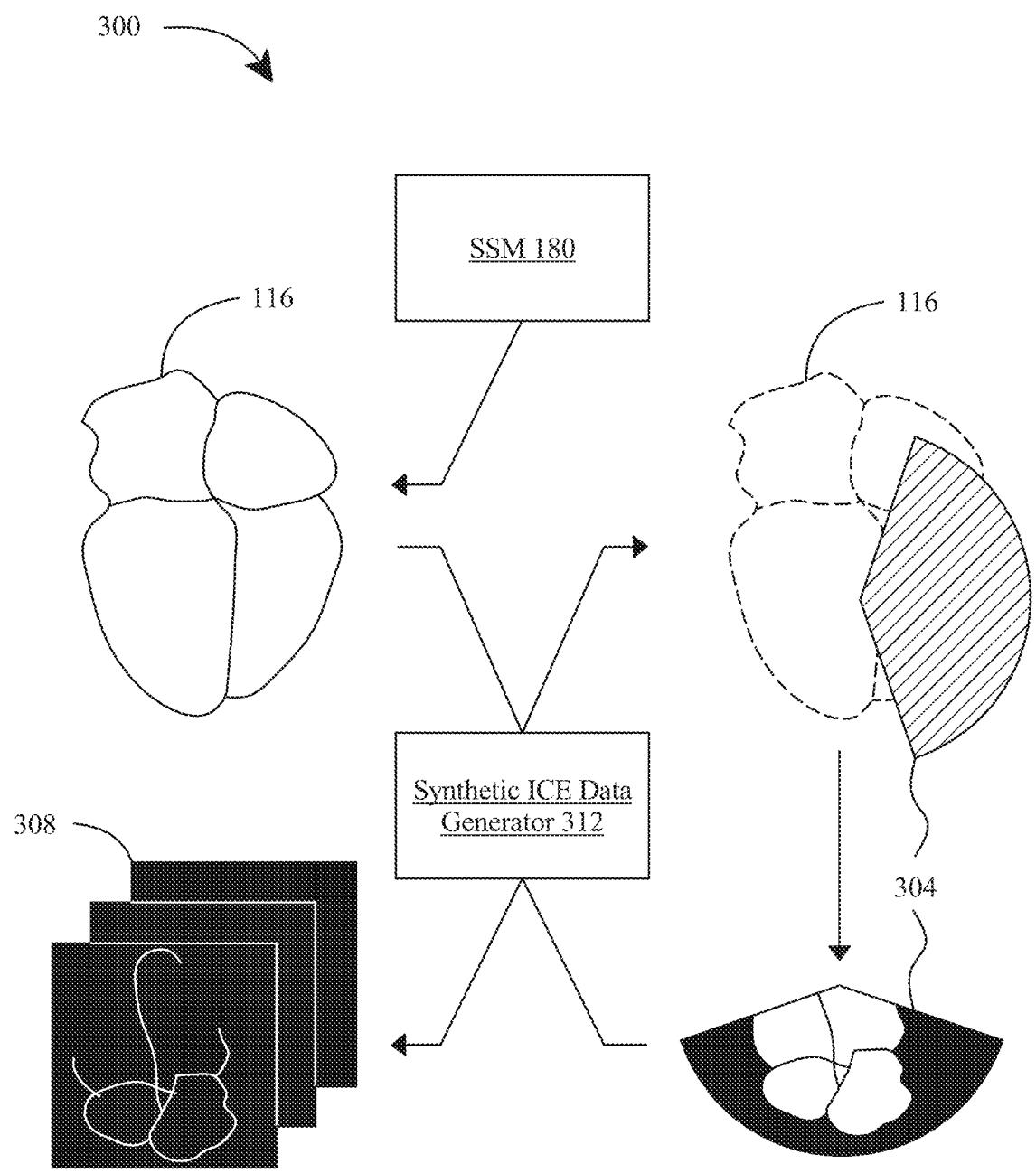
FIG. 3 is a flow diagram of an exemplary embodiment of an ICE image example generation process.

With continued reference to FIG. 3, in some cases, processor 104 may interface with one or more 3D models (i.e., detailed representation of heart's anatomy in a 3D space, capturing intricate structures, chambers, vessels, valves, among others) as described above, or other imaging modalities and/or databases, and equipped with algorithms e.g., CNN, gradient boosting machines, SVM, PCA, and/or the like to analyze model's geometry and spatial relationships upon receiving the 3D models. In some cases, 3D models may be received from SSM 180 as described above with reference to FIG. 1 via a communicative connection between processor 104 and SSM 180. In a non-limiting example, processor 104 may be configured to determine an optimal viewpoints or angles from which ICE view 304 would provide a desired diagnostic value or procedural guidance.

Still referring to FIG. 3, in some cases, identification and selection of ICE view 304 may be automatically identified, using one or more machine learning models as described herein. In a non-limiting example, processor 104 may utilize one or more machine learning models trained on cardiac anatomy viewpoints identification training data, wherein the cardiac anatomy viewpoints identification training data may include a plurality of cardiac anatomies as input correlated to a plurality of ICE images as output and identify at least one ICE view 304 (most informative) for a given cardiac anatomy using the trained machine learning models.

Still referring to FIG. 3, in other cases, ICE view 304 may be defined by a user such as a medical professional. In a non-limiting example user interface 192 of display device 188 may allow a user (e.g., a clinician) to manually rotate, pan, and zoom displayed 3D model and/or corresponding CT scans. As user do so, processor 104 may dynamically calculate and displays potential ICE views 304 based on user's chosen perspective. Additionally, or alternatively, depending on cardiac procedure being planned or executed, processor 104 may prioritize certain ICE views 304. For instance, and without limitation, ICE view 304 may be pre-defined. For atrial fibrillation ablation, ICE view 304 may showcase the pulmonary veins' entrances into the LA may be emphasized. In other cases, ICE view 304 may be automatically identified, by processor 104, using one or more machine learning models as described herein, such as, without limitation, synthetic ICE data generator as described in detail below.

With continued reference to FIG. 3, as used in this disclosure, a "synthetic ICE frame" refers to a digitally generated or simulated image that emulates a visual representation obtained from ICE view 304. In some cases, synthetic ICE frames 308 may be produced using computational methods and/or models such as, without limitation, a synthetic ICE data generator 312 based on pre-existing data, models, or simulations e.g., identified ICE views 304. In a non-limiting example, synthetic ICE frames 308 may include a simplified version e.g., an image illustrating heart anatomy via a plurality of lines indicating contours of heart's structure as shown in FIG. 3. One or more image processing techniques and/or computer vision algorithms such as, without limitation, histogram equalization, adaptive filtering, edge detection (e.g., Canny or Sobel operators), contour extraction, and/or the like may be applied, by processor 104, on a segmented CT scan and/or 3D models based on identified ICE view 304. Synthetic ICE frame 308 may be rendered on a blank canvas or background that mimics the echogenicity of an ICE image according to extracted contours, wherein the extracted contours may be represented as a bold lines and enhanced with shading to give depth. In some cases, synthetic ICE frame 308 may be validated and verified by overlaying synthetic ICE frame 308 onto original ICE view 304, ensuring accuracy and resemblance.

Still referring to FIG. 3, in some cases, generating synthetic ICE frames 308 may include implementations of one or more aspects of "generative artificial intelligence (AI)," a type of AI that uses machine learning algorithms to create, establish, or otherwise generate data such as, without limitation, ICE images, ICE videos, and/or the like that is similar to one or more provided training examples. In an embodiment, machine learning module described herein may generate one or more generative machine learning models that are trained on one or more set of CT scans and/or 3D models in ICE image view 304 as described above. Synthetic ICE data generator 312 may include one or more generative machine learning models may be configured to generate new examples that are similar to the training data of the one or more generative machine learning models but are not exact replicas; for instance, and without limitation, data quality or attributes of the generated examples may bear a resemblance to the training data provided to one or more generative machine learning models, wherein the resemblance may pertain to underlying patterns, features, or structures found within the provided training data.

Still referring to FIG. 3, in some cases, generative machine learning models within synthetic ICE data generator may include one or more generative models. As described herein, "generative models" refers to statistical models of the joint probability distribution P(X, Y) on a given observable variable x, representing features or data that can be directly measured or observed (e.g. CT scans and/or 3D models derived from CT scans) and target variable y, representing the outcomes or labels that one or more generative models aims to predict or generate (e.g., synthetic ICE frames 308). In some cases, generative models may rely on Bayes theorem to find joint probability; for instance, and without limitation, Naïve Bayes classifiers may be employed by computing device to categorize input data such as, without limitation, CT scans and/or 3D models derived from CT scans into different views.

In a non-limiting example, and still referring to FIG. 3, one or more generative machine learning models may include one or more Naïve Bayes classifiers generated, by processor 104, using a Naïve bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)=P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction.

Still referring to FIG. 3, although Naïve Bayes classifier may be primarily known as a probabilistic classification algorithm; however, it may also be considered a generative model described herein due to its capability of modeling the joint probability distribution P(X, Y) over observable variables X and target variable Y. In an embodiment, Naïve Bayes classifier may be configured to make an assumption that the features X are conditionally independent given class label Y, allowing generative model to estimate the joint distribution as P(X, Y)=P(Y)ΠiP(Xi|Y), wherein P(Y) may be the prior probability of the class, and P(X$_i$ |Y) is the conditional probability of each feature given the class. One or more generative machine learning models containing Naïve Bayes classifiers may be trained on labeled training data, estimating conditional probabilities P(X$_i$|Y) and prior probabilities P(Y) for each class; for instance, and without limitation, using techniques such as Maximum Likelihood Estimation (MLE). One or more generative machine learning models containing Naïve Bayes classifiers may select a class label y according to prior distribution P(Y), and for each feature X$_i$, sample at least a value according to conditional distribution P(X$_i$|y). Sampled feature values may then be combined to form one or more new data instance with selected class label y. In a non-limiting example, one or more generative machine learning models may include one or more Naïve Bayes classifiers to generate new examples of ICE images based on CT scans and/or 3D models derived from CT scans (e.g., identified ICE views 304), wherein the models may be trained using training data containing a plurality of features of input data as described herein and/or the like correlated to a plurality of ICE views.

Still referring to FIG. 3, in some cases, one or more generative machine learning models may include generative adversarial network (GAN). As used in this disclosure, a "generative adversarial network" is a type of artificial neural network with at least two sub models (e.g., neural networks), a generator, and a discriminator, that compete against each other in a process that ultimately results in the generator learning to generate new data samples, wherein the "generator" is a component of the GAN that learns to create hypothetical data by incorporating feedbacks from the "discriminator" configured to distinguish real data from the hypothetical data. In some cases, generator may learn to make discriminator classify its output as real. In an embodiment, discriminator may include a supervised machine learning model while generator may include an unsupervised machine learning model as described in further detail with reference to FIGS. 5-7.

With continued reference to FIG. 3, in an embodiment, discriminator may include one or more discriminative models, i.e., models of conditional probability P(Y|X=x) of target variable Y, given observed variable X. In an embodiment, discriminative models may learn boundaries between classes or labels in given training data. In a non-limiting example, discriminator may include one or more classifiers as described in further detail below with reference to FIG. 5 to distinguish between different categories e.g., real vs. fake, or states e.g., TRUE vs. FALSE within the context of generated data such as, without limitations, synthetic ICE frames 308, and/or the like. In some cases, processor 104 may implement one or more classification algorithms such as, without limitation, Support Vector Machines (SVM), Logistic Regression, Decision Trees, and/or the like to define decision boundaries.

In a non-limiting example, and still referring to FIG. 3, generator of GAN may be responsible for creating synthetic data that resembles real ICE images. In some cases, GAN may be configured to receive CT scans and/or 3D models derived from CT scans as input and generates corresponding examples of ICE images containing information describing heart anatomy in different ICE views. On the other hand, discriminator of GAN may evaluate the authenticity of the generated content by comparing it to true ICE images, for example, discriminator may distinguish between genuine and generated content and providing feedback to generator to improve the model performance. Additionally, or alternatively, GAN may include a conditional GAN as an extension of the basic GAN as described herein that allows for generation of ICE images using pre-existing CT scans and/or 3D models derived from CT scans based on certain conditions or labels. In standard GAN, generator may produce samples from random noise, while in a conditional GAN, generator may produce samples based on random noise and a given condition or label.

With continued reference to FIG. 3, in other embodiments, one or more generative models may also include a variational autoencoder (VAE). As used in this disclosure, a "variational autoencoder" is an autoencoder (i.e., an artificial neural network architecture) whose encoding distribution is regularized during the model training process in order to ensure that its latent space includes desired properties allowing new data sample generation. In an embodiment, VAE may include a prior and noise distribution respectively, trained using expectation-maximization meta-algorithms such as, without limitation, probabilistic PCA, sparse coding, among others. In a non-limiting example, VEA may use a neural network as an amortized approach to jointly optimize across input data and output a plurality of parameters for corresponding variational distribution as it maps from a known input space to a low-dimensional latent space. Additionally, or alternatively, VAE may include a second neural network, for example, and without limitation, a decoder, wherein the "decoder" is configured to map from the latent space to the input space.

In a non-limiting example, and still referring to FIG. 3, VAE may be used by processor 104 to model complex relationships between CT scans and/or 3D models derived from CT scans. In some cases, VAE may encode input data into a latent space, capturing example ICE images. Such encoding process may include learning one or more probabilistic mappings from observed CT scans and/or 3D models derived from CT scans to a lower-dimensional latent representation. Latent representation may then be decoded back into the original data space, therefore reconstructing the 3D models representing example ICE images. In some cases, such decoding process may allow VAE to generate new examples or variations that are consistent with the learned distributions.

Additionally, or alternatively, and still referring to FIG. 3, processor 104 may be configured to continuously monitor synthetic ICE data generator. In an embodiment, processor 104 may configure discriminator to provide ongoing feedback and further corrections as needed to subsequent input data. An iterative feedback loop may be created as processor 104 continuously receive real-time data, identify errors (e.g., distance between synthetic ICE frame 308 and real ICE images) as a function of real-time data, delivering corrections based on the identified errors, and monitoring subsequent model outputs and/or user feedbacks on the delivered corrections. In an embodiment, processor 104 may be configured to retrain one or more generative machine learning models within synthetic ICE data generator based on user modified ICE frames or update training data of one or more generative machine learning models within synthetic ICE data generator by integrating validated synthetic ICE frames (i.e., subsequent model output) into the original training data. In such embodiment, iterative feedback loop may allow synthetic ICE data generator to adapt to the user's needs and performance requirements, enabling one or more generative machine learning models described herein to learn and update based on user responses and generated feedbacks.

With continued reference to FIG. 3, other exemplary embodiments of generative machine learning models may include, without limitation, long short-term memory networks (LSTMs), (generative pre-trained) transformer (GPT) models, mixture density networks (MDN), and/or the like. As an ordinary person skilled in the art, upon reviewing the entirety of this disclosure, will be aware of various generative machine learning models may be used generating synthetic ICE frames 308.

Still referring to FIG. 3, in a further non-limiting embodiment, synthetic ICE data generator 312 may be further configured to generate a multi-model neural network that combines various neural network architectures described herein. In a non-limiting example, multi-model neural network may combine LSTM for time-series analysis with GPT models for natural language processing. Such fusion may be applied by computing device to generate synthetic ICE frames 308. In some cases, multi-model neural network may also include a hierarchical multi-model neural network, wherein the hierarchical multi-model neural network may involve a plurality of layers of integration; for instance, and without limitation, different models may be combined at various stages of the network. Convolutional neural network (CNN) may be used for image feature extraction, followed by LSTMs for sequential pattern recognition, and a MDN at the end for probabilistic modeling. Other exemplary embodiments of multi-model neural network may include, without limitation, ensemble-based multi-model neural network, cross-modal fusion, adaptive multi-model network, among others. As an ordinary person skilled in the art, upon reviewing the entirety of this disclosure, will be aware of various generative machine learning models may be used to generating synthetic ICE frames 308 as described herein. As an ordinary person skilled in the art, upon reviewing the entirety of this disclosure, will be aware of various multi-model neural network and combination thereof that may be implemented by apparatus 100 in consistent with this disclosure.

Figure 4:
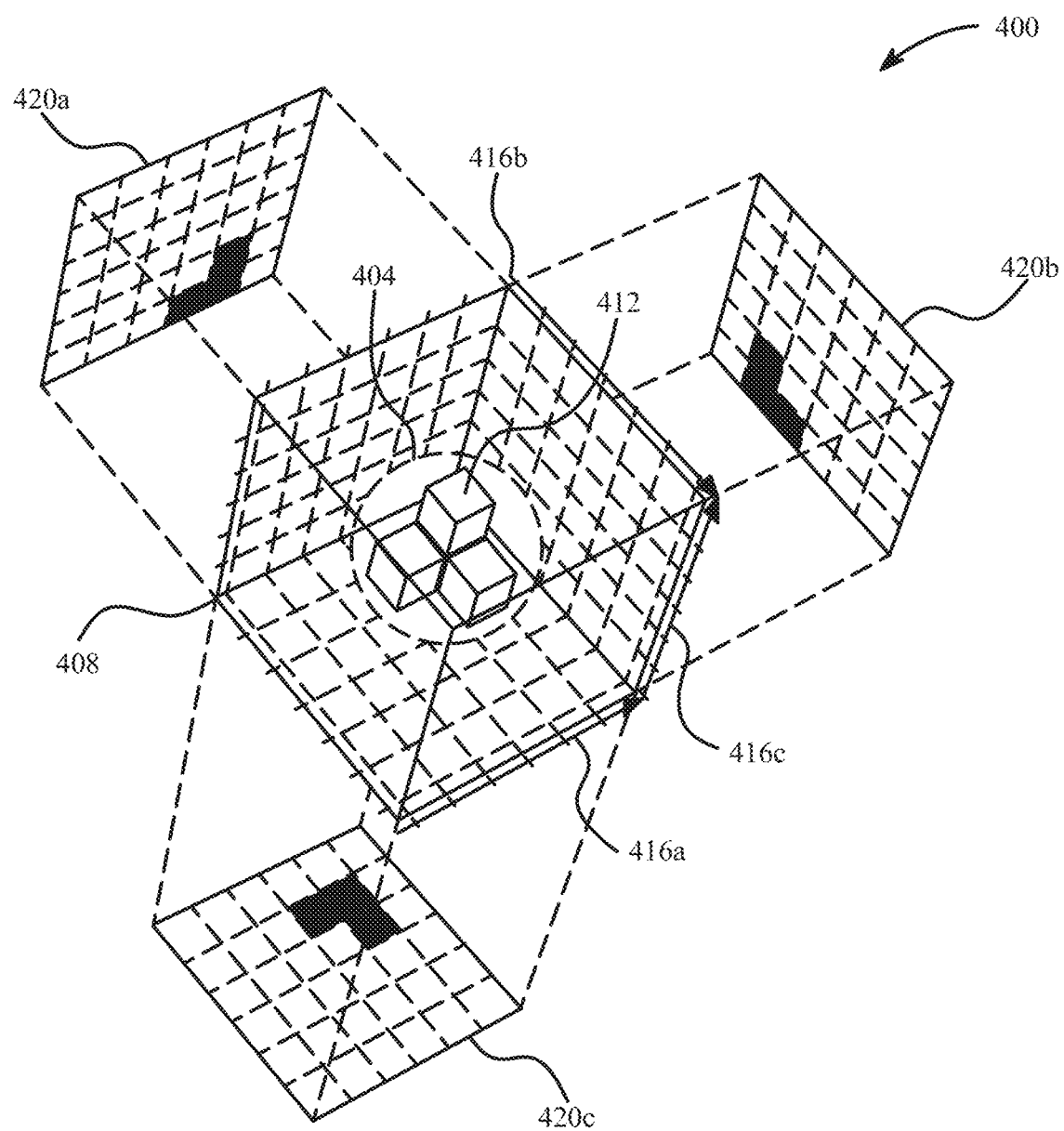
FIG. 4 illustrates an exemplary embodiment of a three-dimensional (3D) voxel occupancy representation.

Now referring to FIG. 4, an exemplary embodiment of a 3D VOR 400 is illustrated. 3D VOR 400 may be used to represent 3D object 404. In an embodiment, 3D VOR 400 may divide a 3D space 408 into a grid of one or more cubic units e.g., voxels 412, wherein each voxel 412 represents a specific volume within 3D space 408. In a non-limiting example, 3D object 404 may include a cardiac anatomy pertaining to a subject.

Still referring to FIG. 4, in some cases, each voxel 412 may act as a basic building block. In a non-limiting example, each voxel 412 may be configured to represent a discrete portion of 3D space 408. In an embodiment, each voxel 412 may include a presence indicator as described above with reference to FIG. 1, which denotes whether the voxel is occupied or unoccupied. In such embodiment, the binary or continuous value may allow 3D VOR 400 to map the presence or absence of material within each voxel 412, creating a granular representation of 3D object 404.

With continued reference to FIG. 4, in some cases, the resolution of 3D VOR 400 may be determined by the size and number of voxels within the grid. In a non-limiting example, smaller voxel may provide a higher resolution, capturing finer details, while larger voxels offer a more generalized representation.

Still referring to FIG. 4, in an embodiment, voxels 412 may be arranged in a regular pattern along three axis 416a-b, each pointing a distinct direction. In a non-limiting example, voxels 412 may be arranged along x, y, and z axes, wherein such arrange may facilitate efficient manipulation and rendering of the 3D object 404. In some cases, spatial features 420a-c such as, without limitation, edges, surfaces, textures, and any other spatial features as described above with reference to FIG. 1, may be extracted from 3D VOR 400 by analyzing the relationships and patterns between neighboring voxels.

Figure 5:
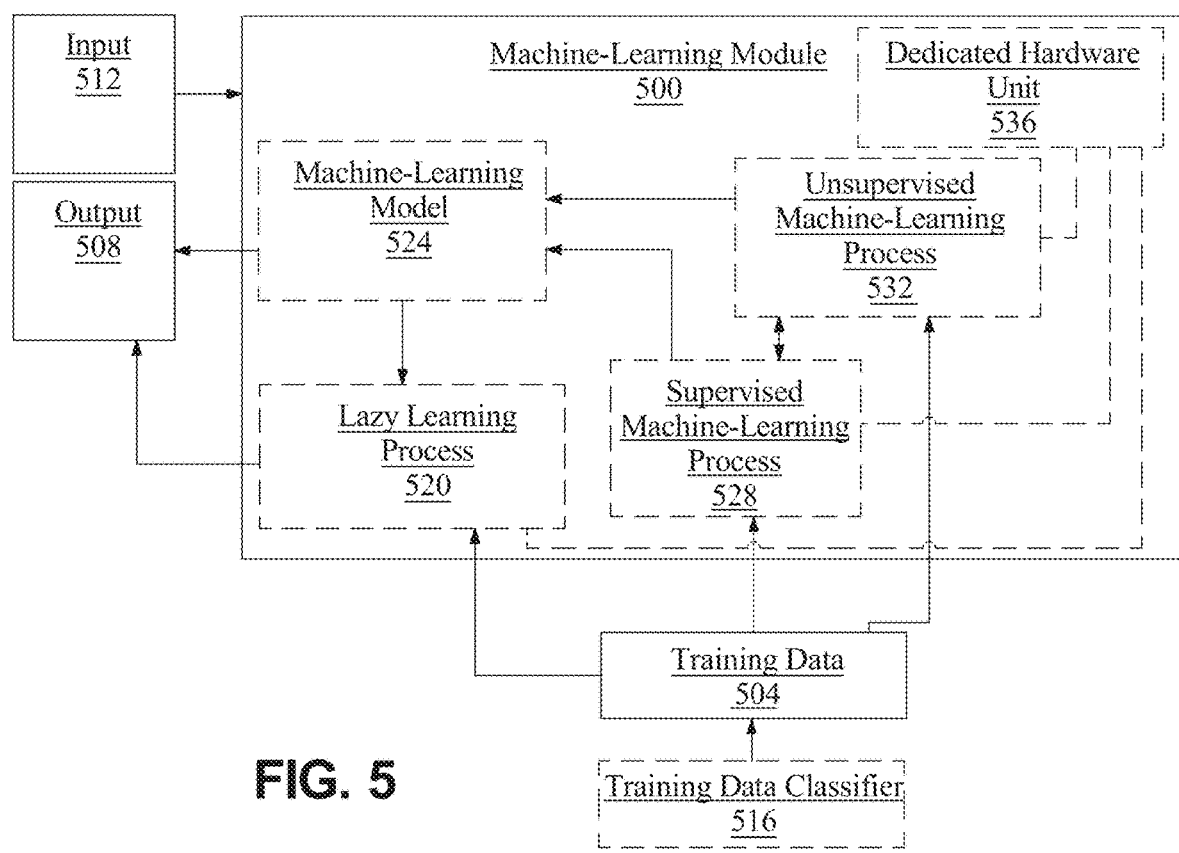
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, image sets may be correlated with plurality of CT-based cardiac anatomy models as training data that may be used to train cardiac anatomy modeling machine learning model as described above with reference to FIG. 1.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to at least one template model of plurality of template modules as described above with reference to FIG. 1.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a plurality of image sets as described above as inputs, a plurality of shape parameter sets as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/ or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
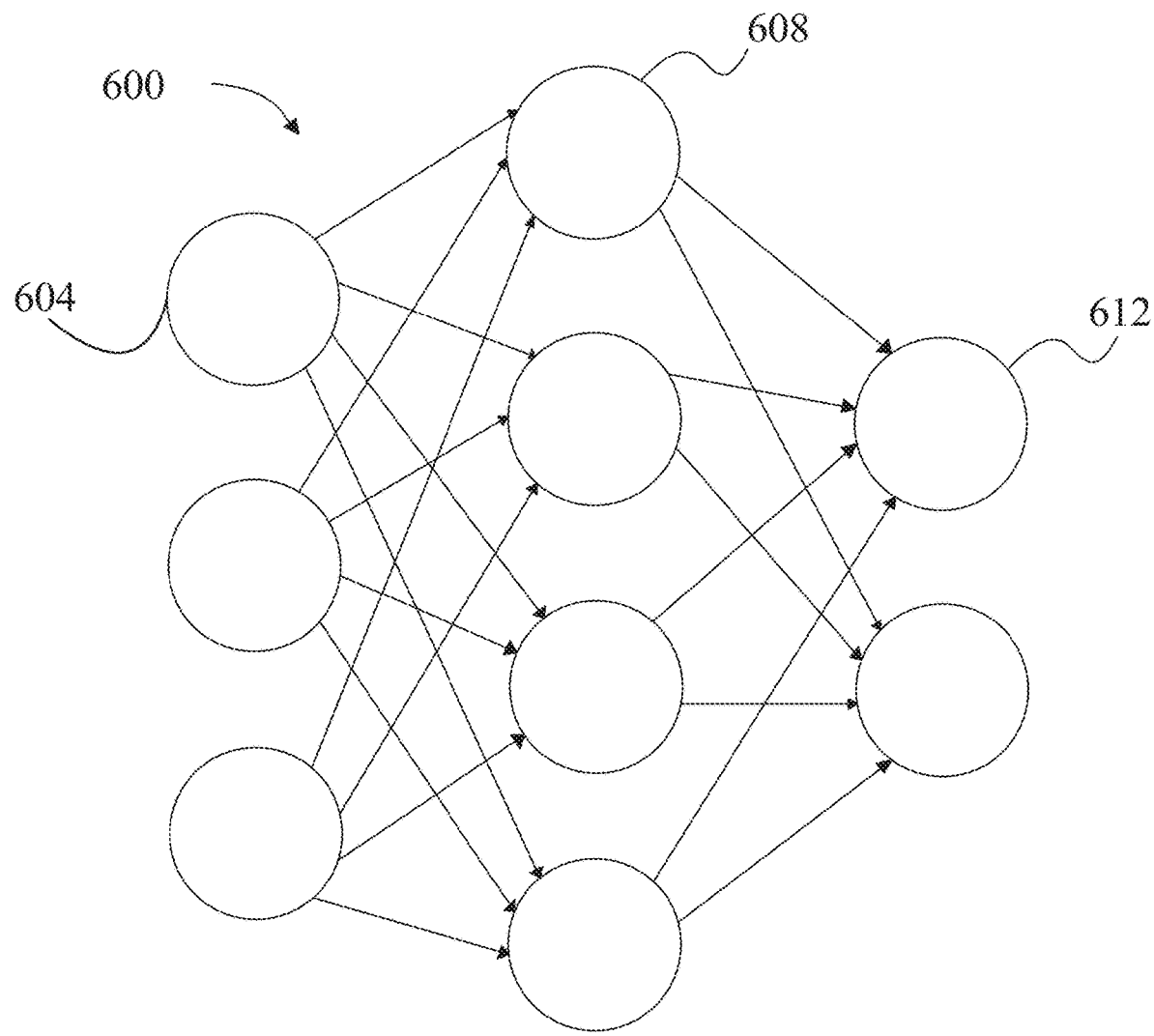
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
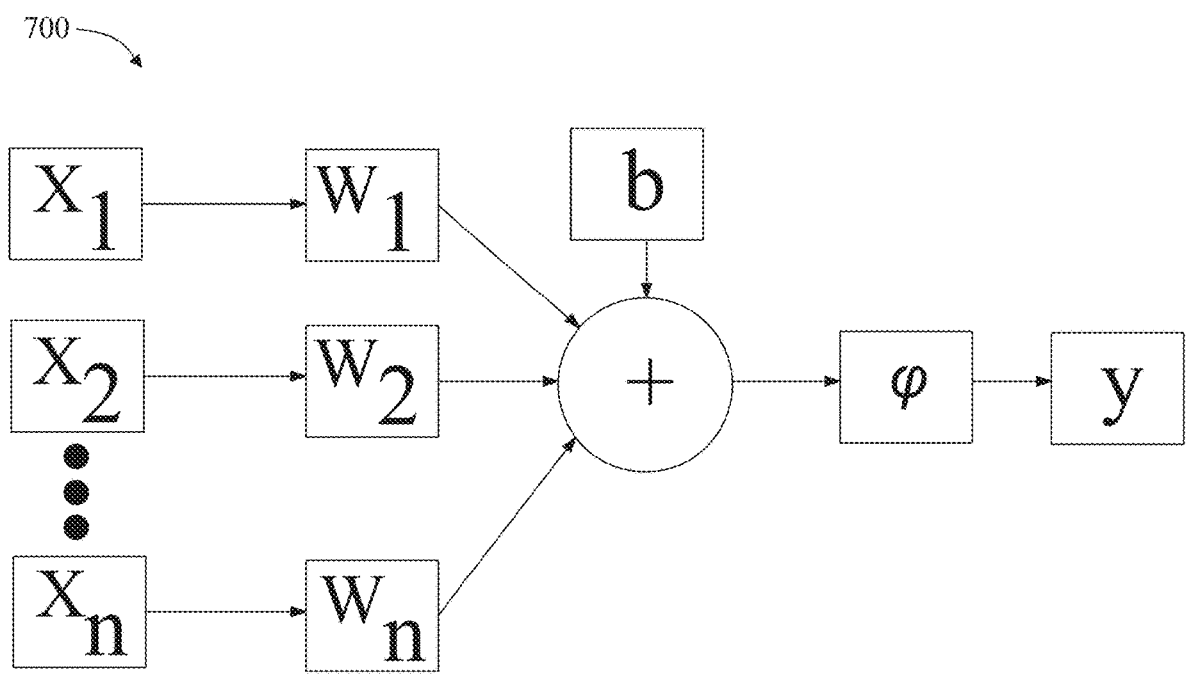
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh(hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
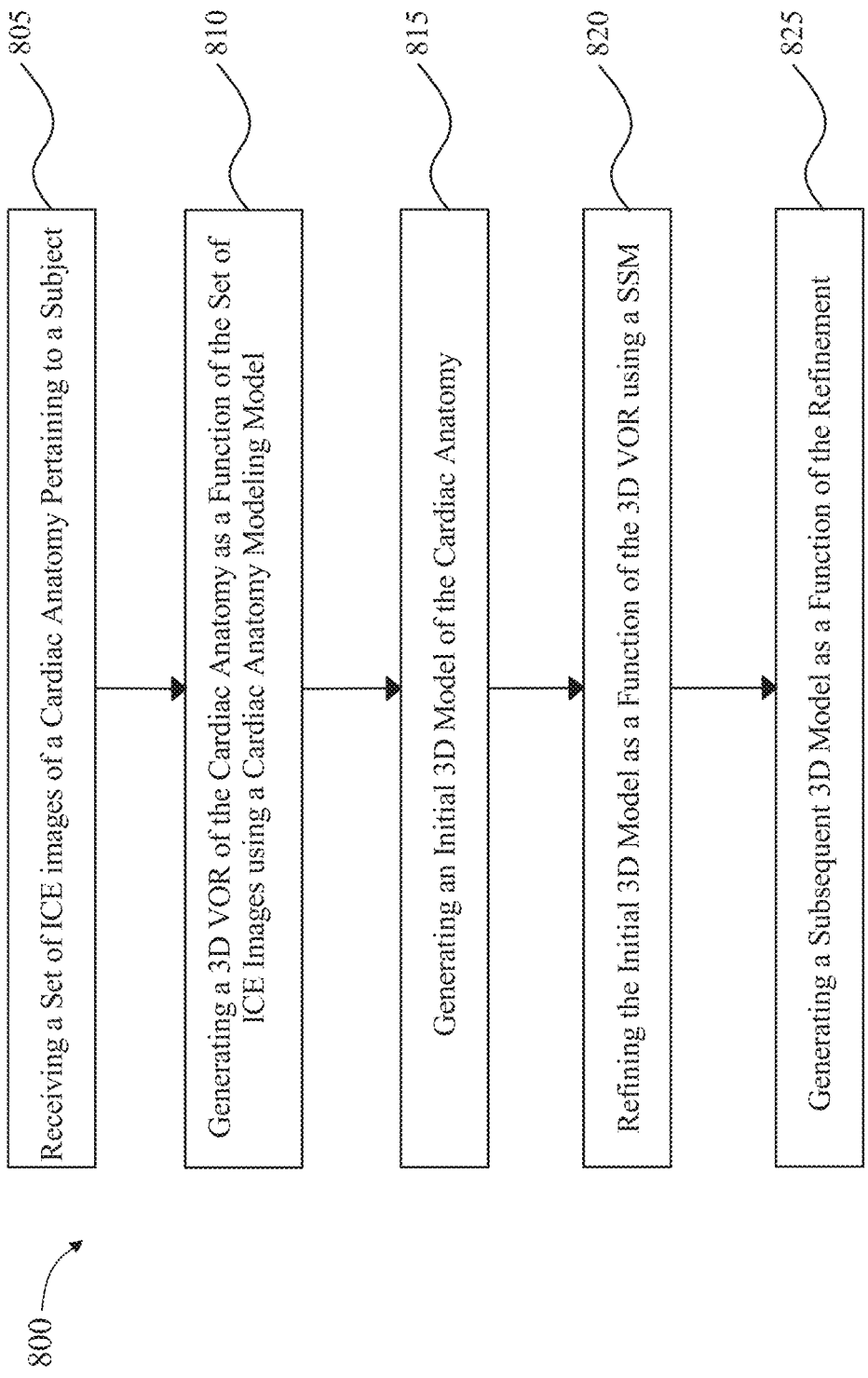
FIG. 8 is a flow diagram illustrating an exemplary embodiment of a method for generating a three-dimensional (3D) model of cardiac anatomy via machine-learning.

Now referring to FIG. 8, an exemplary embodiment of a method 800 for generating a three-dimensional (3D) model of cardiac anatomy via machine-learning is illustrated. Method 800 includes a step 805 of receiving, by at least a processor, a set of images of a cardiac anatomy pertaining to a subject. In some embodiments, receiving the set of images comprises receiving the set of images from a patient profile. This may be implemented, without limitation, as described above with reference to FIGS. 1-7.

With continued reference to FIG. 8, method 800 includes a step 810 of generating, by the at least a processor, an 3D data structure representing the cardiac anatomy as a function of the set of images. In some embodiments, the 3D data structure representing the cardiac anatomy may include a 3D voxel occupancy representation (VOR) having plurality of voxels, wherein each voxel of the plurality of voxels may include a corresponding presence indicator. In other embodiments, the 3D data structure representing the cardiac anatomy may include a 3D grid configured to map the presence indicators of the plurality of voxels, wherein the 3D grid may include one or more spatial features extracted from the set of images of the cardiac anatomy. This may be implemented without limitation, as described above with reference to FIGS. 1-7.

Still referring to FIG. 8, step 810 of generating the 3D data structure further includes receiving cardiac anatomy training data, wherein the cardiac anatomy training data contains a plurality of image sets as input and a plurality of computed tomography (CT) based cardiac anatomy models as output, training a cardiac anatomy modeling model using the cardiac anatomy training data, and generating the 3D data structure representing the cardiac anatomy as a function of the set of images using the trained cardiac anatomy modeling model. In some embodiments, the cardiac anatomy modeling model may include a Deep Neural Network (DNN). This may be implemented without limitation, as described above with reference to FIGS. 1-7.

Still referring to FIG. 8, alternatively, step 810 of generating the 3D VOR may include generating a set of shape parameters based on the set of images of the cardiac anatomy, wherein generating the set of shape parameters may include training a shape identification model using cardiac geometry training data, wherein the cardiac geometry training data contains the plurality of image sets as input correlated to a plurality of shape parameter sets as output and generating the set of shape parameters as a function of the set of ICE images using the trained shape identification model. This may be implemented without limitation, as described above with reference to FIGS. 1-7.

With continued reference to FIG. 8, method 800 includes a step 815 of generating, by the at least a processor, an initial 3D model of the cardiac anatomy. This may be implemented without limitation, as described above with reference to FIGS. 1-7.

With continued reference to FIG. 8, method 800 includes a step 820 of refining, by the at least a processor, the generated initial 3D model of the cardiac anatomy as a function of the 3D data structure representing the cardiac anatomy. In some embodiments, the initial 3D model of the cardiac anatomy may include a template model selected from a plurality of pre-determined template models. In some embodiments, refining the initial 3D model of the cardiac anatomy may include deforming the template model to match the generated 3D data structure representing the cardiac anatomy. In other embodiments, refining the initial 3D model of the cardiac anatomy may include adjusting the subsequent 3D model of the cardiac anatomy as a function of a set of shape parameters. This may be implemented without limitation, as described above with reference to FIGS. 1-7.

With continued reference to FIG. 8, method 800 includes a step 825 of generating, by the at least a processor, a subsequent 3D model of the cardiac anatomy as a function of the refinement. This may be implemented without limitation, as described above with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
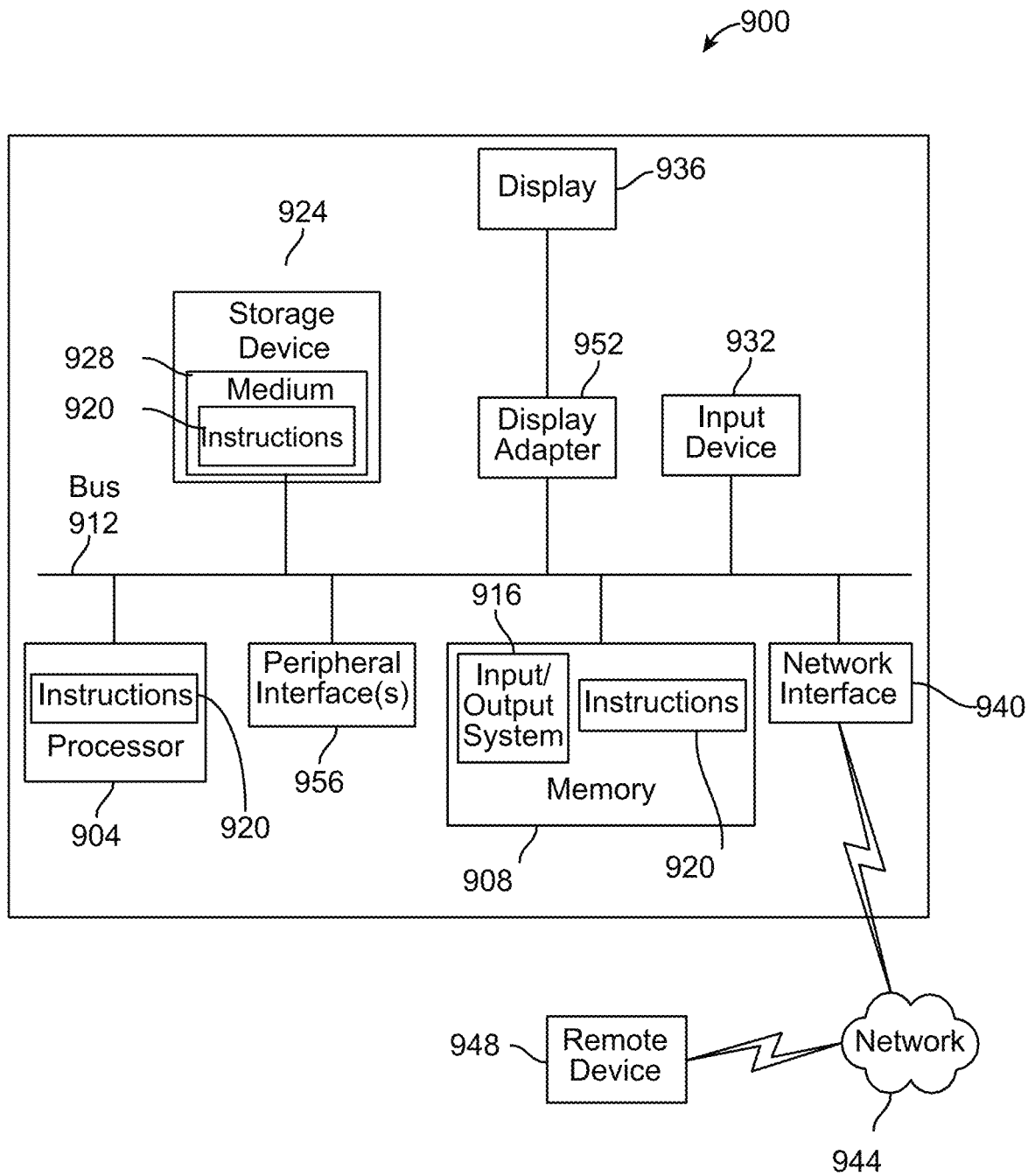
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a three-dimensional (3D) model of cardiac anatomy via machine-learning, wherein the apparatus comprises:
  at least a processor; and
  a memory communicatively connected to the at least a processor, wherein the memory contains instructions configuring the at least a processor to:
    receive a set of images of a cardiac anatomy pertaining to a subject;
    generate cardiac anatomy training data using a 3D heart model, wherein the cardiac anatomy training data comprises a plurality of synthetic images;
    train a cardiac anatomy modeling model using the generated cardiac anatomy training data;
    generate a three-dimensional (3D) data structure representing the cardiac anatomy using the trained cardiac anatomy modeling model; and
    refine an initial 3D model as a function of the 3D data structure representing the cardiac anatomy.

2. The apparatus of claim 1, wherein receiving the set of images comprises receiving the set of images from a patient profile.

3. The apparatus of claim 1, wherein the 3D heart model is configured to receive ongoing feedback and corrections to the 3D heart model and provide corrections to subsequent synthetic images.

4. The apparatus of claim 3, wherein generating the cardiac anatomy training data comprises:
  generating the 3D heart model using a plurality of computed tomography (CT) scans;
  generating, as a function of the 3D heart model, a plurality of synthetic intracardiac echocardiography (ICE) frames using a synthetic ICE data generator; and generating the cardiac anatomy training data as a function of the plurality of synthetic ICE frames.

5. The apparatus of claim 1, wherein the 3D data structure representing the cardiac anatomy comprises:
 a 3D voxel occupancy representation (VOR) having a plurality of voxels, wherein each voxel of the plurality of voxels comprises a corresponding presence indicator.

6. The apparatus of claim 5, wherein the 3D data structure representing the cardiac anatomy further comprises:
 a 3D grid configured to map the presence indicators of the plurality of voxels, wherein the 3D grid comprises one or more spatial features extracted from the set of images of the cardiac anatomy.

7. The apparatus of claim 1, wherein the synthetic images comprise synthetic ICE image frames, wherein the synthetic ICE image frames comprise bold lines and shading to represent extracted contours of an ICE image.

8. The apparatus of claim 1, wherein the initial 3D model of the cardiac anatomy comprises a template model selected from a plurality of pre-determined template models.

9. The apparatus of claim 8, wherein refining the initial 3D model of the cardiac anatomy comprises:
 deforming the template model to match the generated 3D data structure representing the cardiac anatomy.

10. The apparatus of claim 8, wherein refining the initial 3D model of the cardiac anatomy comprises:
 adjusting the refined initial 3D model of the cardiac anatomy as a function of a set of shape parameters.

11. A method for generating a three-dimensional (3D) model of cardiac anatomy via machine-learning, wherein the method comprises:
 receiving, by at least a processor, a set of images of a cardiac anatomy pertaining to a subject;
 generating, by the at least a processor, cardiac anatomy training data using a 3D heart model, wherein the cardiac anatomy training data comprises a plurality of synthetic images;
 training, by the at least a processor, a cardiac anatomy modeling model using the generated cardiac anatomy training data;
 generating, by the at least a processor, a three-dimensional (3D) data structure representing the cardiac anatomy using the trained cardiac anatomy modeling model; and
 refining, by the at least a processor, an initial 3D model as a function of the 3D data structure representing the cardiac anatomy.

12. The method of claim 11, wherein receiving the set of images comprises receiving the set of images from a patient profile.

13. The method of claim 11, wherein the 3D heart model is configured to receive ongoing feedback and corrections to the 3D heart model and provide corrections to subsequent synthetic images.

14. The method of claim 11, wherein generating the cardiac anatomy training data comprises:
 generating the 3D heart model using a plurality of computed tomography (CT) scans;
 generating, as a function of the 3D heart model, a plurality of synthetic intracardiac echocardiography (ICE) frames using a synthetic ICE data generator; and
 generating the cardiac anatomy training data as a function of the plurality of synthetic ICE frames.

15. The method of claim 11, wherein the 3D data structure representing the cardiac anatomy comprises:
 a 3D voxel occupancy representation (VOR) having a plurality of voxels, wherein each voxel of the plurality of voxels comprises a corresponding presence indicator.

16. The method of claim 15, wherein the 3D data structure representing the cardiac anatomy further comprises:
 a 3D grid configured to map the presence indicators of the plurality of voxels, wherein the 3D grid comprises one or more spatial features extracted from the set of images of the cardiac anatomy.

17. The method of claim 11, wherein the synthetic images comprise synthetic ICE image frames, wherein the synthetic ICE image frames comprise bold lines and shading to represent extracted contours of an ICE image.

18. The method of claim 11, wherein the initial 3D model of the cardiac anatomy comprises a template model selected from a plurality of pre-determined template models.

19. The method of claim 18, wherein refining the initial 3D model of the cardiac anatomy comprises:
 deforming the template model to match the generated 3D data structure representing the cardiac anatomy.

20. The method of claim 18, wherein refining the initial 3D model of the cardiac anatomy comprises:
 adjusting the refined initial 3D model of the cardiac anatomy as a function of a set of shape parameters.

* * * * *